(12) United States Patent
Stefani

(10) Patent No.: US 10,046,640 B2
(45) Date of Patent: Aug. 14, 2018

(54) DASHBOARD FOR A ROAD VEHICLE

(71) Applicant: Ferrari S.p.A., Modena (IT)

(72) Inventor: Giovanni Stefani, Cadiroggio (IT)

(73) Assignee: Ferrari S.p.A., Modena (IT)

( * ) Notice: Subject to any disclaimer, the term of this patent is extended or adjusted under 35 U.S.C. 154(b) by 28 days.

(21) Appl. No.: 15/255,571

(22) Filed: Sep. 2, 2016

(65) Prior Publication Data

US 2017/0087988 A1 Mar. 30, 2017

(30) Foreign Application Priority Data

Sep. 4, 2015 (IT) .......................... UB2015A003423

(51) Int. Cl.
| | |
|---|---|
| *B60K 37/02* | (2006.01) |
| *B60K 35/00* | (2006.01) |
| *B60K 37/04* | (2006.01) |
| *G01D 13/04* | (2006.01) |

(52) U.S. Cl.
CPC .............. *B60K 37/02* (2013.01); *B60K 35/00* (2013.01); *B60K 37/04* (2013.01); *G01D 13/04* (2013.01); *B60K 2350/1064* (2013.01); *B60K 2350/2043* (2013.01); *B60K 2350/2095* (2013.01); *B60K 2350/406* (2013.01); *B60K 2350/408* (2013.01); *B60K 2350/941* (2013.01); *B60K 2350/962* (2013.01)

(58) Field of Classification Search
CPC ........ B60K 37/02; B60K 35/00; B60K 37/04; B60K 2350/406; B60K 2350/962; B60K 2350/2043; B60K 2350/1064; B60K 2350/408; B60K 2350/941; B60K 2350/2095; G01D 13/04

See application file for complete search history.

(56) References Cited

U.S. PATENT DOCUMENTS

| 8,814,375 B2* | 8/2014 | Makita | G01D 13/28 362/23.01 |
|---|---|---|---|
| 2005/0212669 A1* | 9/2005 | Ono | B60K 37/02 340/461 |
| 2008/0022570 A1* | 1/2008 | Kageyama | B60K 37/02 40/541 |
| 2014/0261153 A1* | 9/2014 | Mochizuki | G01D 11/28 116/28 R |
| 2015/0049454 A1* | 2/2015 | Blackmer | B60K 37/02 362/23.02 |

(Continued)

FOREIGN PATENT DOCUMENTS

| DE | 10144615 A1 * | 3/2003 | ............ B60K 35/00 |
|---|---|---|---|
| JP | 2009-107482 | 5/2009 | |
| WO | WO 2008/132957 A1 | 11/2008 | |

*Primary Examiner* — Paul N Dickson
*Assistant Examiner* — Joselynn Y Sliteris
(74) *Attorney, Agent, or Firm* — Blank Rome LLP

(57) ABSTRACT

A dashboard for a road vehicle; the dashboard having: a digital screen; and an analog instrument, which is provided with a circular support element and a pointer that moves inside the support element; the analog instrument can be arranged in an operating position, in which the analog instrument overlaps the digital screen so that the support element of the analog instrument covers a corresponding part of said digital screen; and the support element of the analog instrument is opaque and has a plurality of through openings, through which the light generated by the underlying digital screen can come out.

15 Claims, 25 Drawing Sheets

(56) References Cited

U.S. PATENT DOCUMENTS

| | | | |
|---|---|---|---|
| 2016/0091360 A1* | 3/2016 | Otani | G01G 23/32 |
| | | | 177/178 |
| 2016/0161303 A1* | 6/2016 | Otani | B60K 35/00 |
| | | | 116/288 |
| 2016/0207453 A1* | 7/2016 | McDade | G01D 5/262 |
| 2016/0209250 A1* | 7/2016 | Hopersberger | G01D 11/28 |
| 2016/0347242 A1* | 12/2016 | Clochard | B60K 37/02 |

* cited by examiner

DASHBOARD FOR A ROAD VEHICLE

TECHNICAL FIELD

The present invention relates to a dashboard for a road vehicle.

The present invention advantageously applies to a car dashboard, to which the following description will make explicit reference without thereby losing generality.

PRIOR ART

A car includes a control panel, which forms the front wall of the driver and passenger compartment located beneath the windscreen. The control panel supports the dashboard, which is arranged in front of the driver immediately behind the steering wheel.

In the past, the dashboard included only analogue instruments with pointers and a few warning lights; small liquid crystal digital screens gradually appeared, which over time became increasingly larger and more defined (i.e. with a higher number of pixels to show more and more complex images) until they became fully programmable. In the beginning, the liquid crystal digital screens replaced the mileometer and some of the warning lights, subsequently they replaced the secondary analogue instruments (such as for example the residual fuel indicator and the clock), and eventually in some cases they also replaced the main analogue instruments (i.e. the speedometer and the rev counter) forming a fully digital instrumentation.

The fully digital instrumentation is usually very appreciated at "cruising" speed (especially in cities) because, being fully programmable, it allows for highlighting useful driving information (for instance the speed of the vehicle which is an indispensable information for compliance with the limits set by the law and the navigator) so that the useful driving information can be read easily and immediately without having to overly distract the eye from the road. However, the fully digital instrumentation is generally less appreciated in "sporty" driving situations, particularly when driving on the track, as the drivers in this context prefer to have a large analogue instrument that indicates the engine revolutions (i.e. a rev counter) and is arranged at the centre of the dashboard (i.e. aligned with the steering wheel in order to ensure the highest possible visibility).

In high-performance sports cars currently in production, a compromise is normally reached which provides for the presence of a single analogue instrument that indicates the engine revolutions (i.e. a rev counter) flanked by one or two liquid crystal digital screens; however, this solution is a compromise that generally penalizes both the analogue instrument (which cannot be very large so as not to take away too much room needed for the liquid crystal digital screens), and the liquid crystal digital screens (which necessarily have relatively small dimensions so as not to overlap with the analogue instrument and, therefore, are not well suited to show a detailed chart navigator that instead is highly appreciated especially in urban driving).

The patent application JP2009107482A and the patent application WO2008132957A1 describe a dashboard for a road vehicle having a digital screen and an analogue instrument with a pointer that can move between an operating position, in which the analogue instrument overlaps the digital screen, and a rest position, in which the analogue instrument does not overlap the digital screen.

SUMMARY OF THE INVENTION

The object of the present invention is to provide a dashboard for a road vehicle which is provided with both a digital screen and an analogue instrument, and which allows for an optimal view of both.

According to the present invention, a dashboard for a road vehicle is provided, as claimed in the appended claims.

BRIEF DESCRIPTION OF THE DRAWINGS

The present invention will now be described with reference to the accompanying drawings, which illustrate some non-limiting embodiments thereof, in which.

PREFERRED EMBODIMENTS OF THE INVENTION

Figure 1:
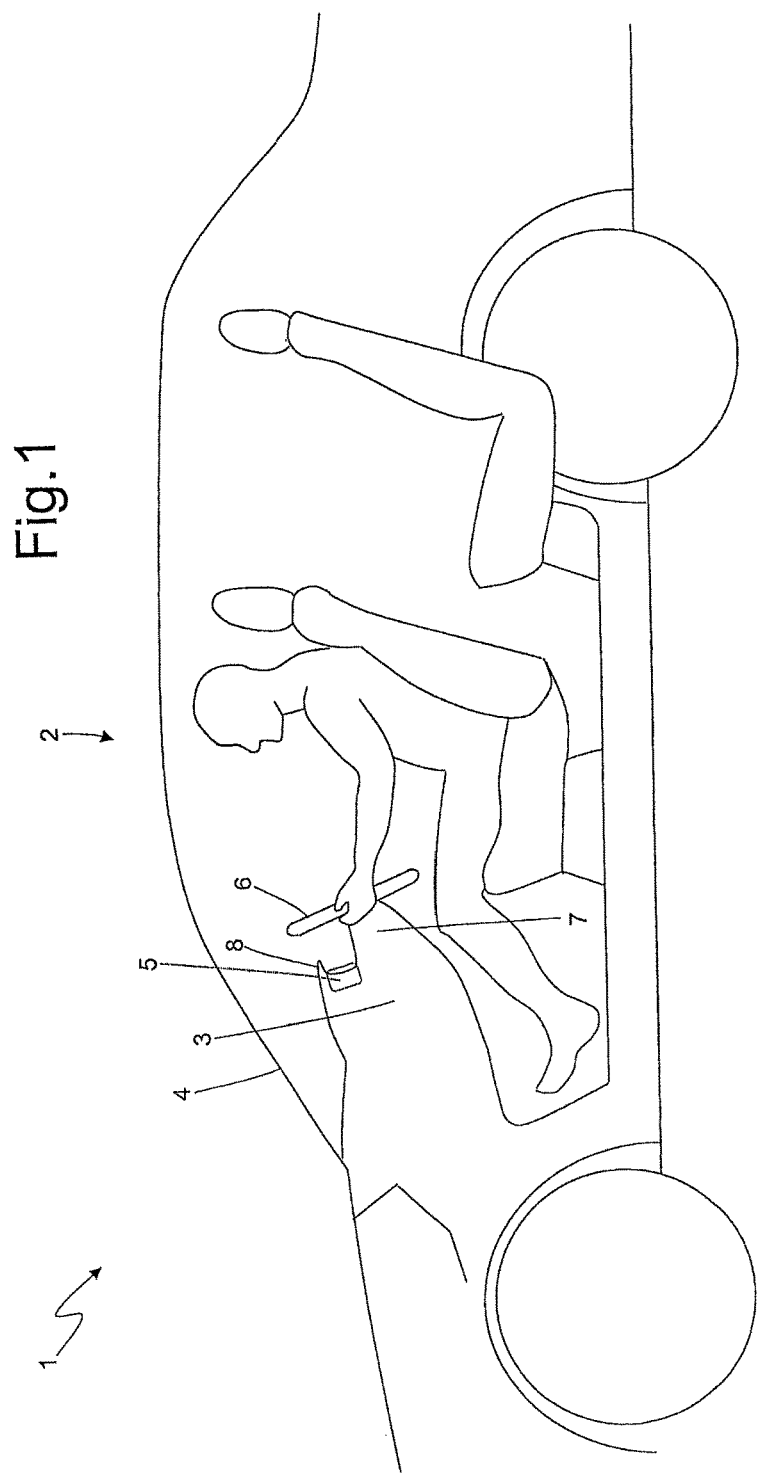
FIG. 1 is a schematic view of a car provided with a dashboard manufactured according to the present invention.

In FIG. 1, the numeral 1 indicates a car, as a whole, comprising a driver and passenger compartment 2 frontally delimited by a control panel 3 that is arranged beneath a windscreen 4. The control panel 3 supports a dashboard 5, which is arranged in front of the driver immediately behind a steering wheel 6. In particular, the dashboard 5 is located immediately above a box-shaped support body 7 which houses, on the inside, the steering shaft (i.e. the element at one end of which the steering wheel 6 is mounted) and is covered, on the upper side, by a protective cover 8.

Figure 2:
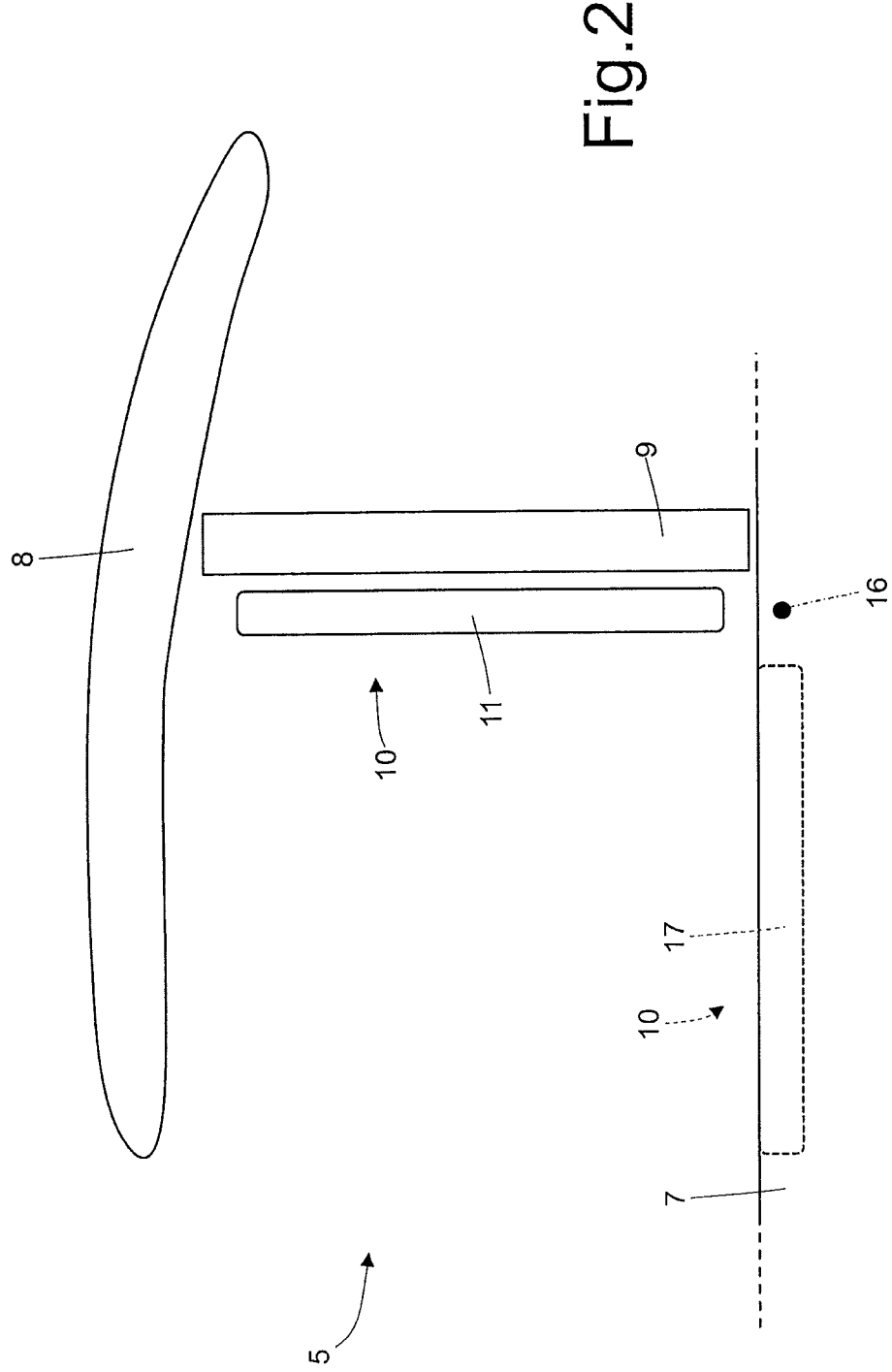
FIG. 2 is a schematic side view of the dashboard of FIG. 1.
Figure 3:
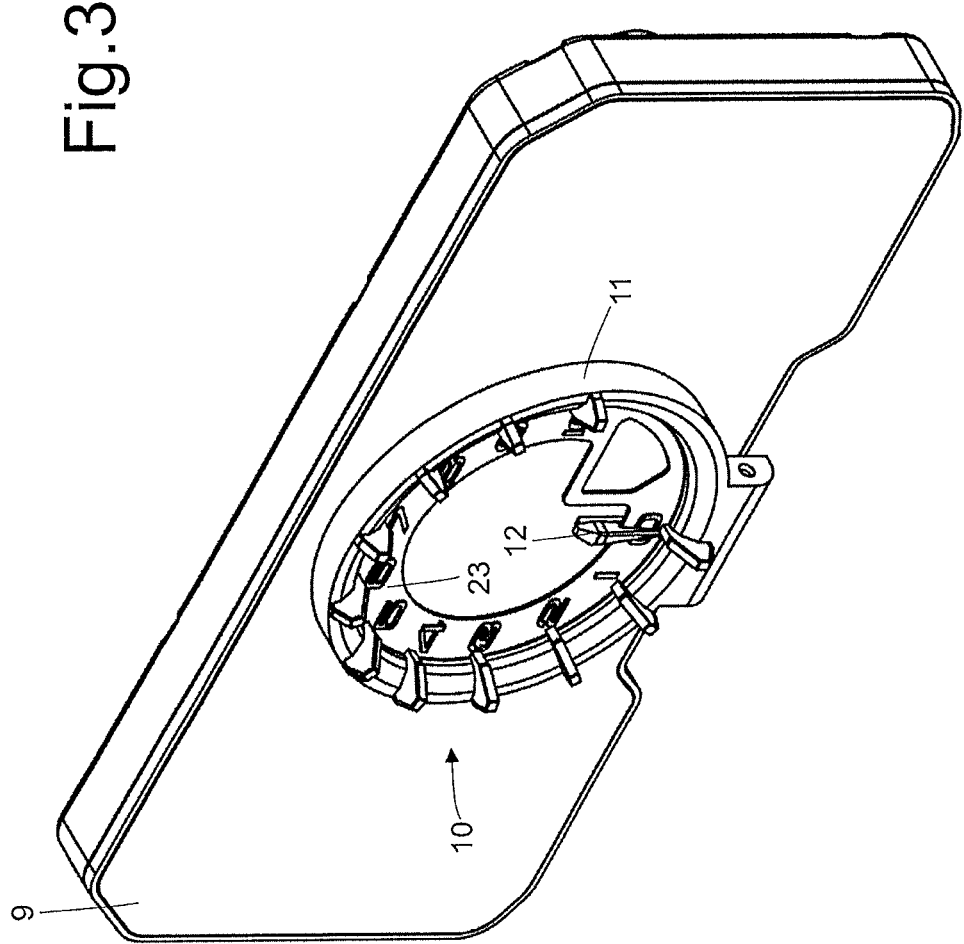
FIG. 3 is a perspective view of a digital screen coupled to an analogue instrument of the dashboard in FIG. 2.

As shown in FIG. 2, the dashboard 5 comprises a digital screen 9 (typically a liquid crystal display), which is driven by a control unit and is fully programmable (i.e. can be programmed to display any type of information). Furthermore, the dashboard 5 comprises an analogue instrument with a pointer (i.e. an instrument that uses a mobile pointer to indicate the measure); as better illustrated in FIGS. 3 and 4, the analogue instrument 10 comprises a circular support element 11 (which constitutes the dial of the analogue instrument 10, i.e. the graduated scale on which the measured values are read) and a pointer 12 that moves on the inside of the support element 11.

Figure 7:
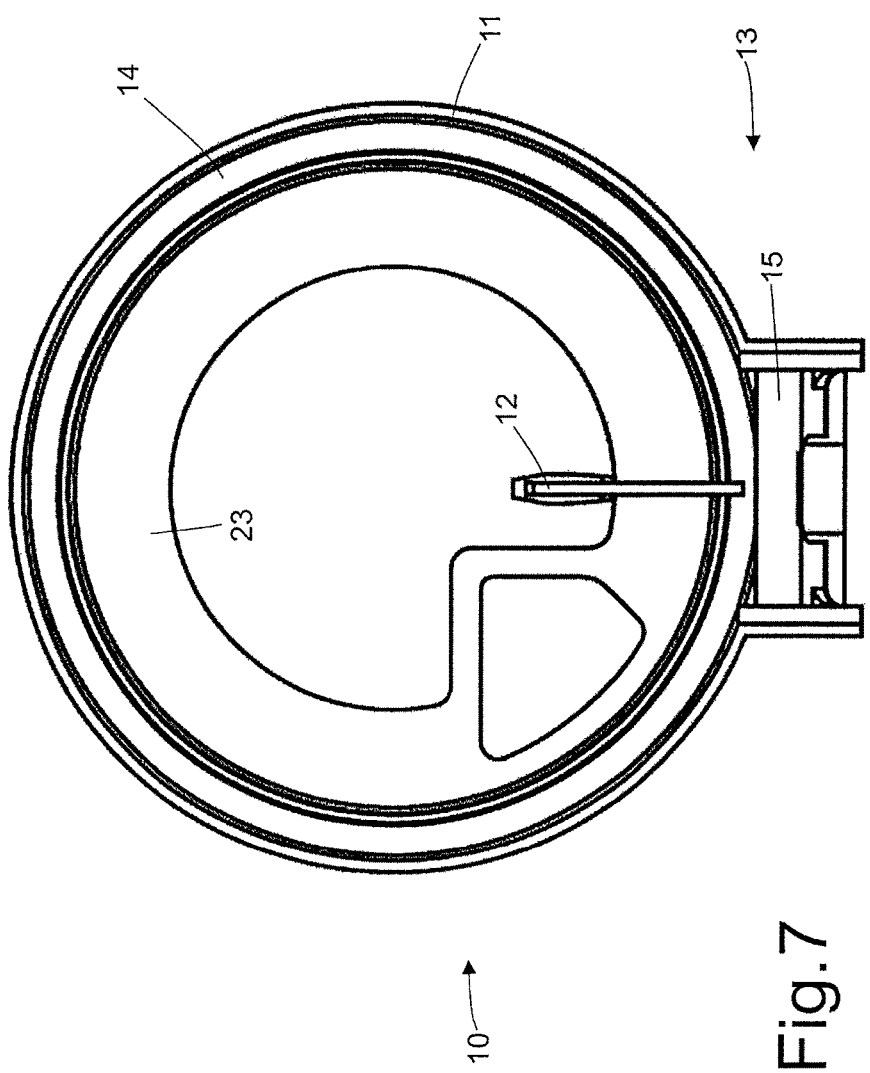
FIG. 7 is a rear view of the analogue instrument.

According to the (non-limiting) embodiment shown in FIG. 7, a motorized movement device 13 is provided, which moves the pointer 12 along the support element 11. The movement device 13 comprises a ring 14, which is slidably mounted inside the support element 11 so as to be free to rotate with respect to said support element 11 and supports the pointer 12, and an electric motor 15 (for example a stepper motor), which is mechanically coupled to the ring 14 to set said ring 14 in motion relative to the support element 11. For example, the electric motor 15 could cause the rotation of a worm screw which engages a rack formed on the outer edge of the ring 14. The pointer 12 has a "U" shape and comprises an inner leg, which is located behind the support element 11 and is integral with the ring 14, and an outer leg, which is located in front of the support element 11. Of course, the pointer 12 and/or the movement device 13 may have any other shape.

Figure 4:
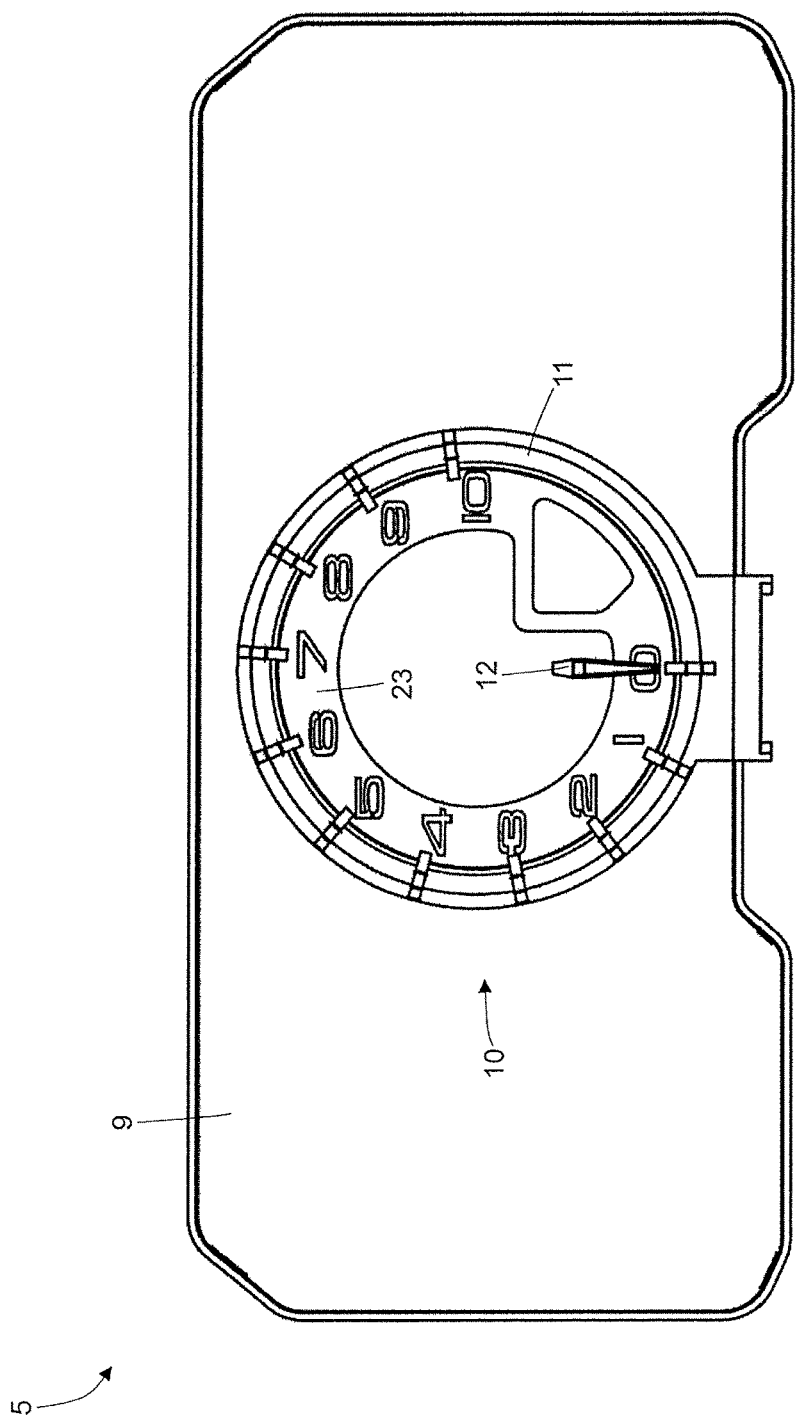
FIG. 4 is a front view of the digital screen coupled to the analogue instrument.
Figure 5:
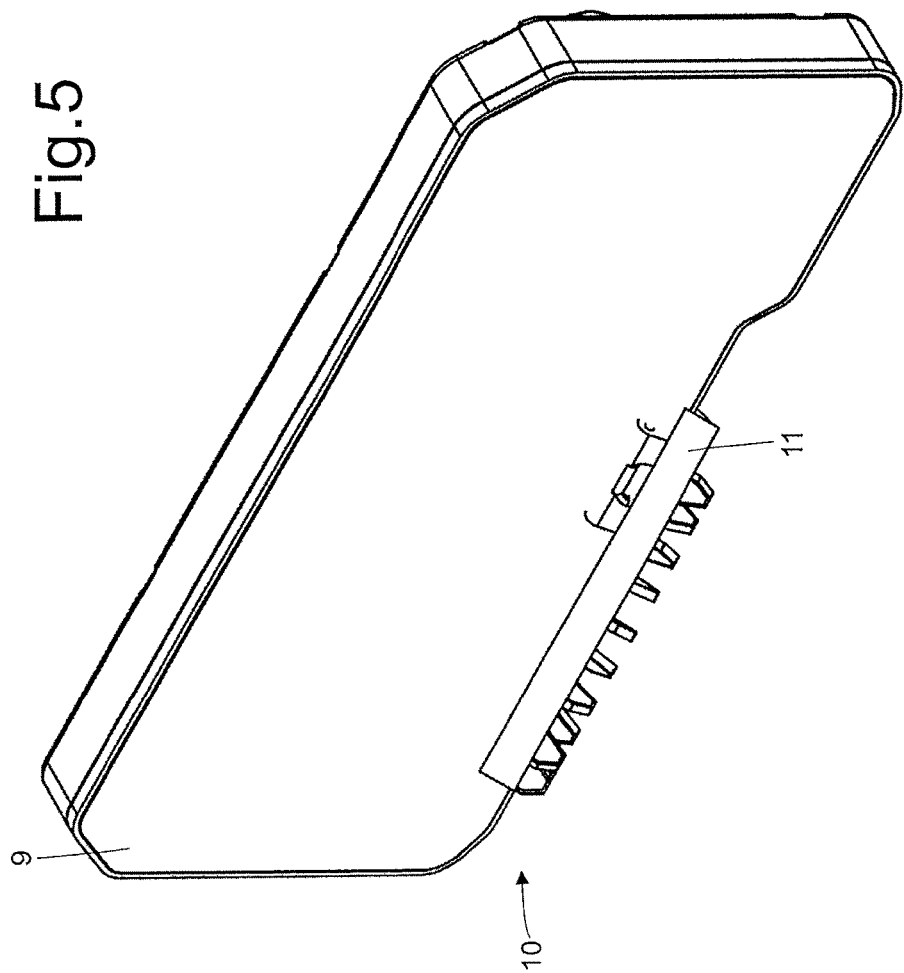
FIGS. 5 and 6 are two different perspective views of the digital screen with the analogue instrument in two different positions.
Figure 6:
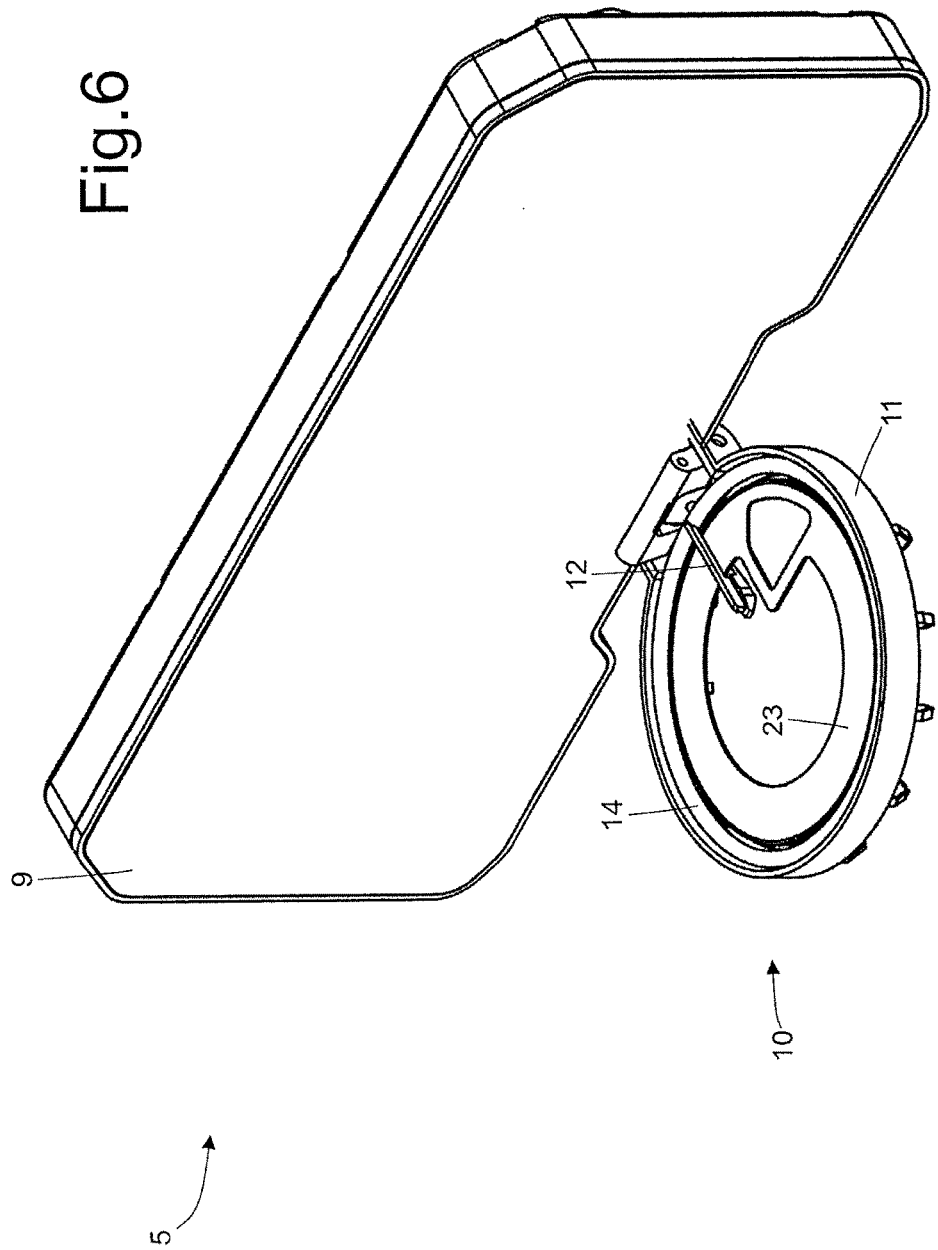

As shown in FIGS. 2-6, the analogue instrument 10 is movably mounted in a frame of the dashboard 5 so as to be able to move between an operating position (shown by the solid line in FIG. 2 and also shown in FIGS. 3 and 4), in which the analogue instrument 10 overlaps the digital screen 9 in such a way that the support element 11 of the analogue instrument 10 covers a corresponding part of the digital screen 9 itself, and a rest position (shown by the dashed line in FIG. 2 and also shown in FIG. 6), in which the analogue instrument 10 does not overlap the digital screen 9 (i.e. is relatively far from the digital screen 9) and does not cover the view of the digital screen 9 itself. FIG. 5 shows the analogue instrument 10 in an intermediate position between the operating position and the rest position, i.e. it shows the analogue instrument 10 while moving between the operating position and the rest position. In the operating position, the analogue instrument 10 covers part of the digital screen 9 and therefore the driver can only see the parts of the digital screen 9 which are not covered by the analogue instrument 10; instead, in the rest position, the analogue instrument 10 is separated from the digital screen 9 to enable the driver to have a full view that is unimpeded by the digital screen 9 itself.

In the embodiment illustrated in FIGS. 2-6, the analogue instrument 10 is hinged to the frame of the dashboard 5 so as to perform a rotation of approximately 90° around a fixed rotation axis 16 during its movement between the operating position and the rest position. Accordingly, in the operating position, the analogue instrument 10 is parallel to the digital screen 9, and in the rest position, the analogue instrument 10 is perpendicular to the digital screen 9. In particular, in the embodiment illustrated in FIGS. 2-6, the fixed rotation axis 16 is arranged at a lower edge of the digital screen 9, and so, to move towards the rest position, the analogue instrument 10 lowers towards the support body 7 of the steering shaft. According to a preferred, but not limiting, embodiment illustrated in FIG. 2, the support body 7 which houses, on the inside, the steering shaft is provided, on the upper side, with a seat 17, which is designed to house the analogue instrument 10 in the rest position; i.e., in the rest position, the analogue instrument 10 enters the seat 17 that is formed in the support body 7 and negatively reproduces the shape of the analogue instrument 10 itself.

Figure 8:
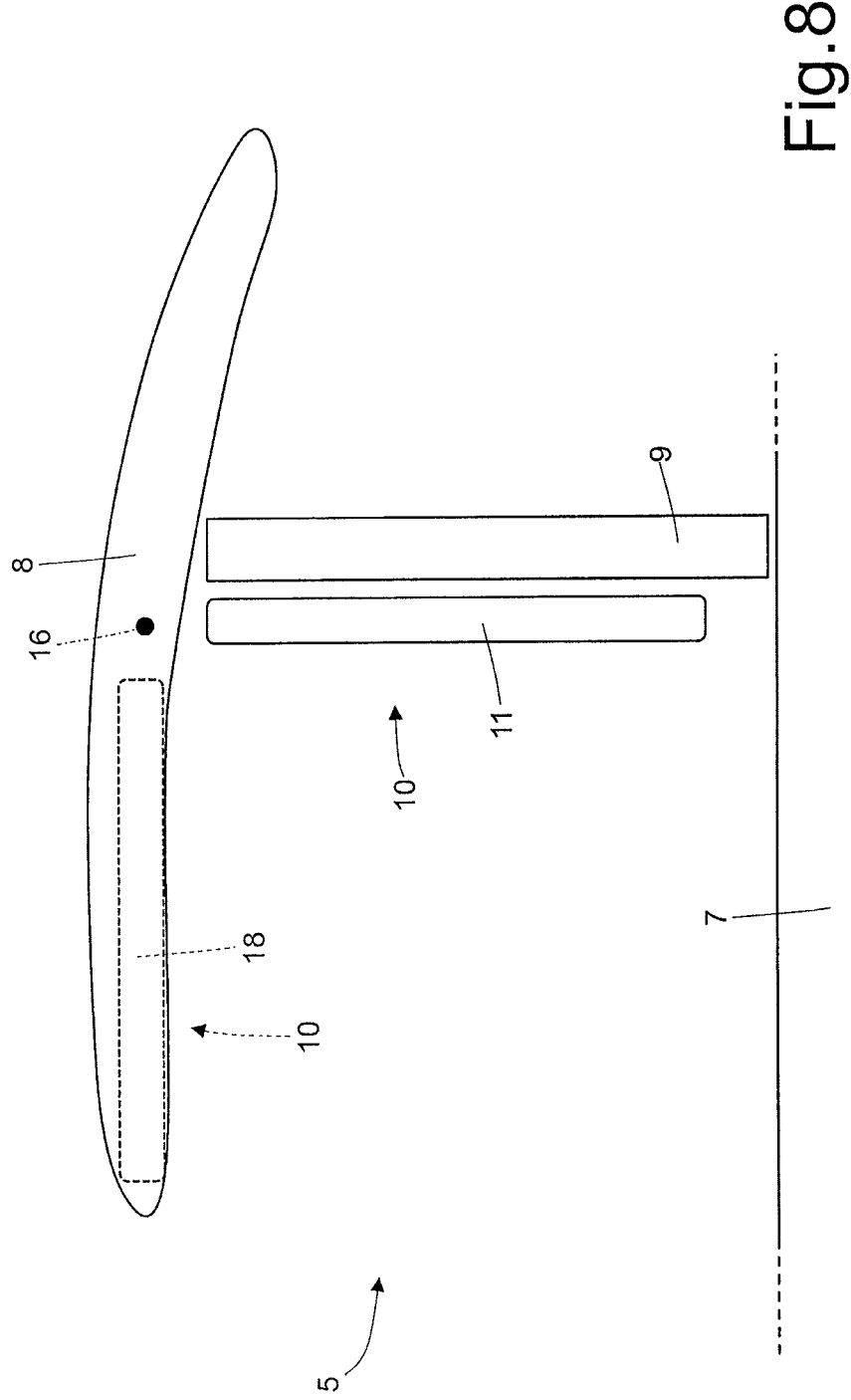
FIG. 8 is a schematic side view of a variant of the dashboard of FIG. 1.

According to the variant shown in FIG. 8, the analogue instrument 10 is still hinged to the frame of the dashboard 5 to perform a rotation of approximately 90° around the fixed rotation axis 16 during its movement between the operating position and the rest position; however, the fixed rotation axis 16 is located at an upper edge of the digital screen 9, and so, to move towards the rest position, the analogue instrument 10 lifts towards the cover 8. According to a preferred, but not limiting, embodiment illustrated in FIG. 2, the cover 8 is provided, on the lower side, with a seat 17, which is designed to house the analogue instrument 10 in the rest position; i.e., in the rest position, the analogue instrument 10 enters the seat 17 that is formed in the cover and negatively reproduces the shape of the analogue instrument 10 itself.

Figure 9:
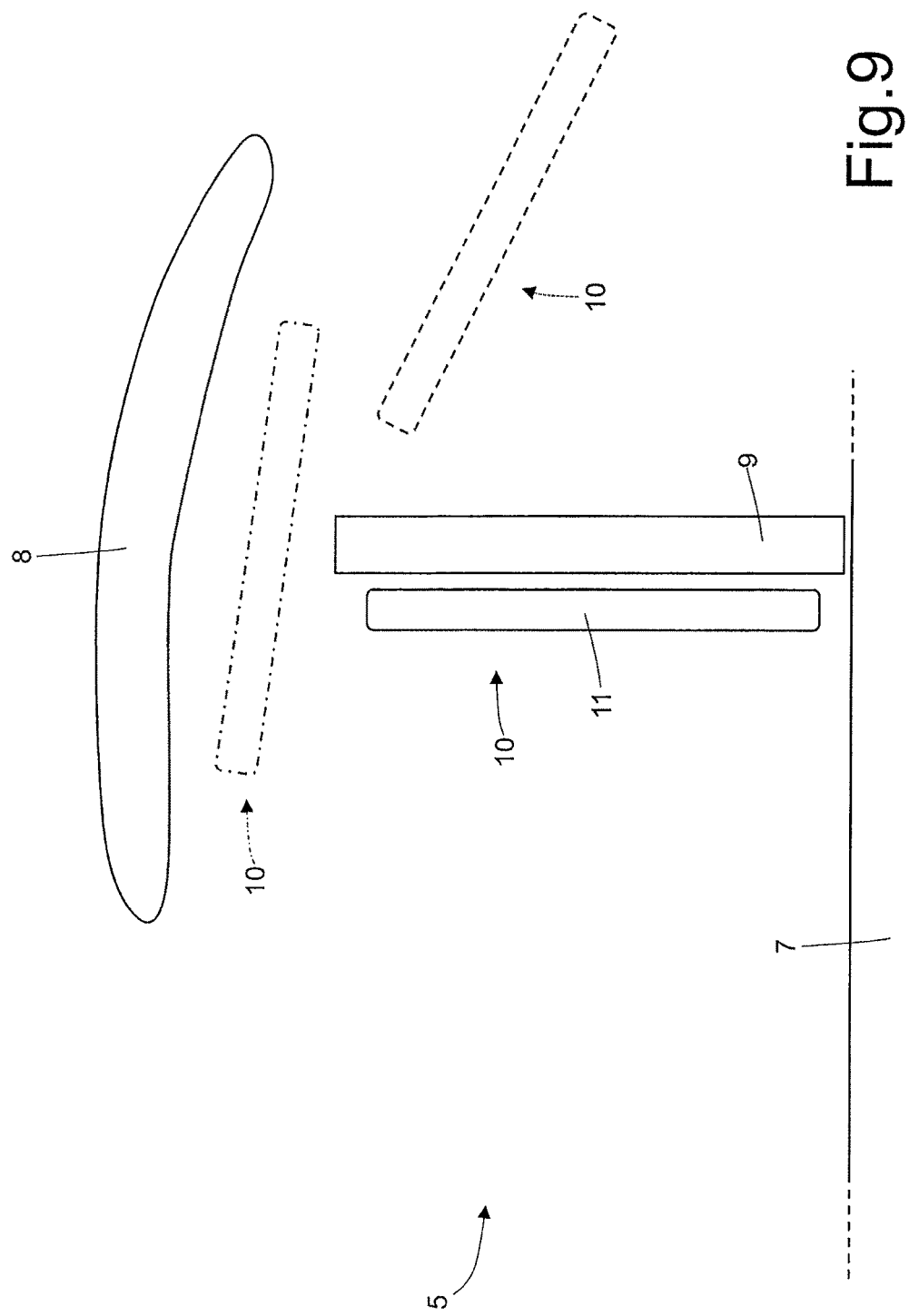
FIG. 9 is a schematic side view of another variant of the dashboard of FIG. 1.

According to the variant shown in FIG. 9, the analogue instrument 10 is connected to a frame of the dashboard 5 by means of a kinematic mechanism 19 (shown in FIGS. 10-18) which causes said analogue instrument 10 to perform a rototranslation during its movement between the operating position (shown by the solid line in FIG. 9) and the rest position (shown by the dashed line in FIG. 9). The dash-dot line in FIG. 9 shows the analogue instrument 10 in an intermediate position between the operating position (shown by the solid line) and the rest position (shown by the dashed line), i.e. it shows the analogue instrument 10 while moving between the operating position and the rest position. In the variant shown in FIG. 9, in the rest position, the analogue instrument 10 is behind the digital screen 9; i.e. to move from the operating position to the rest position, the analogue instrument 10 passes behind the digital screen 9 in such a way that in the rest position the analogue instrument 10 is completely hidden by the digital screen 9.

To allow for the movement of the analogue instrument 10 between the rest position and the operating position, the cover 8 is mounted so as to be movable and lift, thus becoming detached from said digital screen 9 (as shown in FIG. 9) when the analogue instrument 10 moves between the rest position and the operating position. In other words, normally the cover 8 is substantially in contact with the digital screen 9 (or in any case very close to the digital screen 9) and lifts from the digital screen 9 (as shown in FIG. 9) only to enable the analogue instrument 10 to move between the rest position and the operating position.

Figure 10:
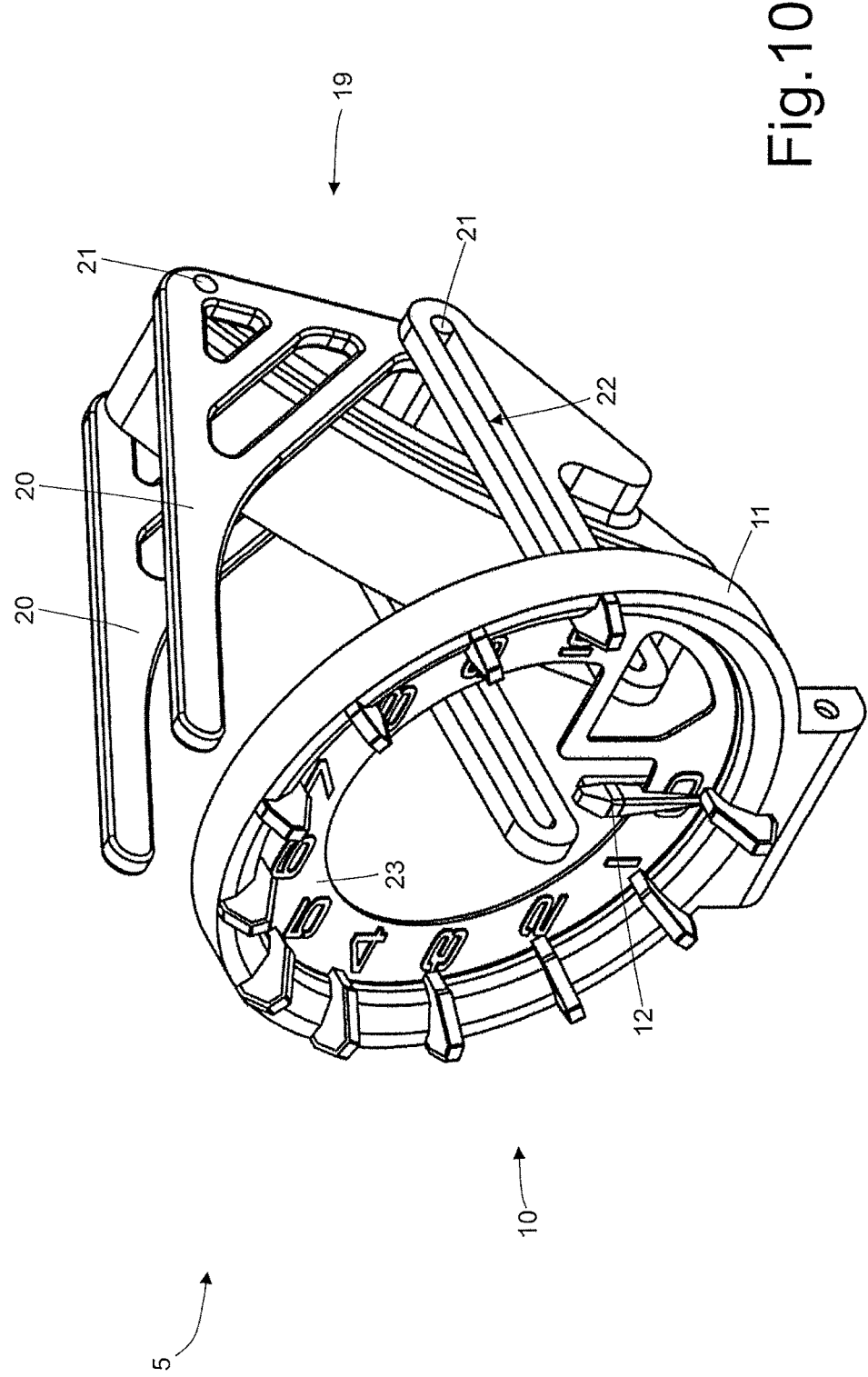
FIG. 10 is a perspective view of a moving system of the analogue instrument of FIG. 9.
Figure 11:
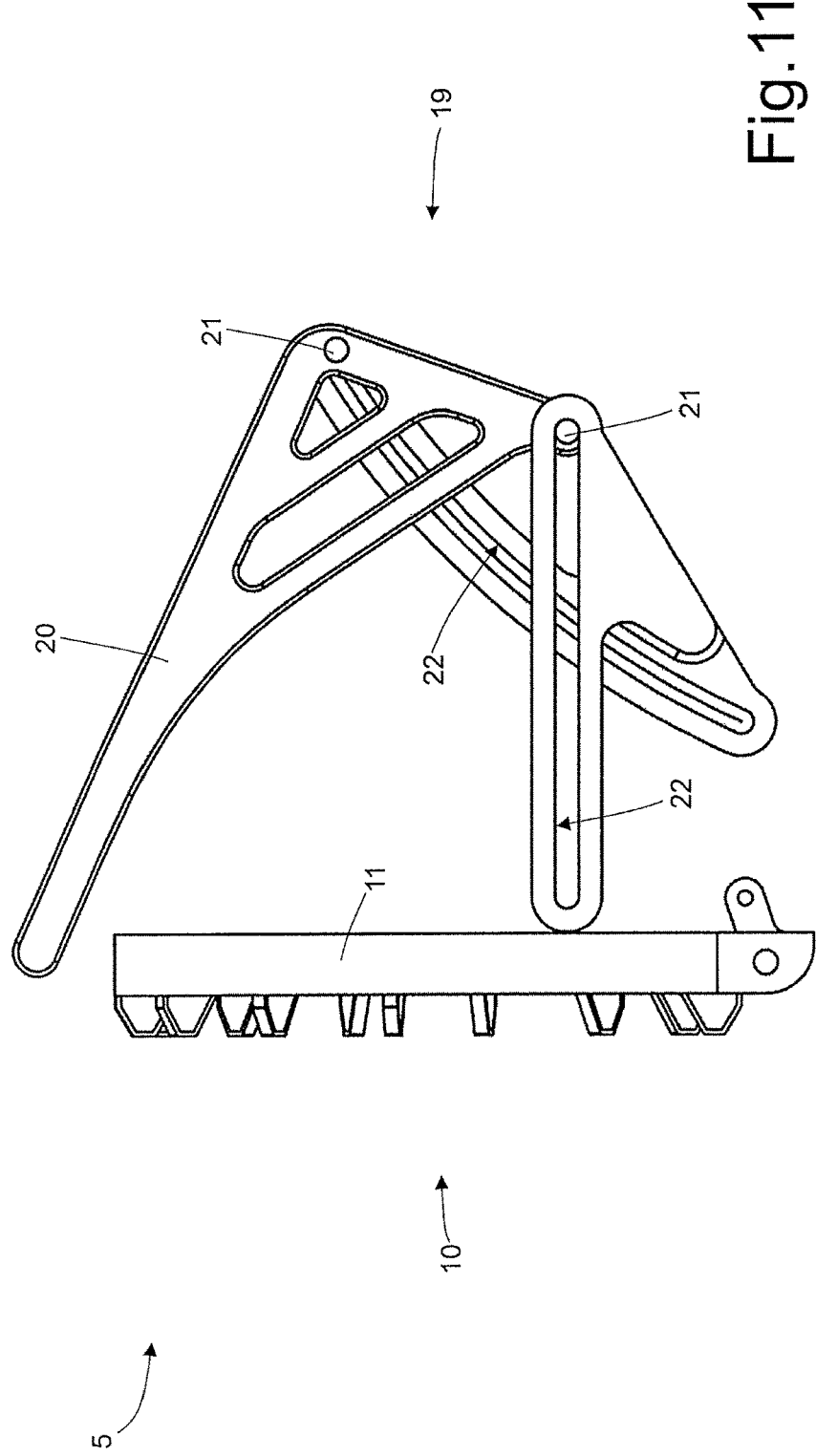
FIG. 11 is a side view of the moving system of FIG. 10.
Figure 12:
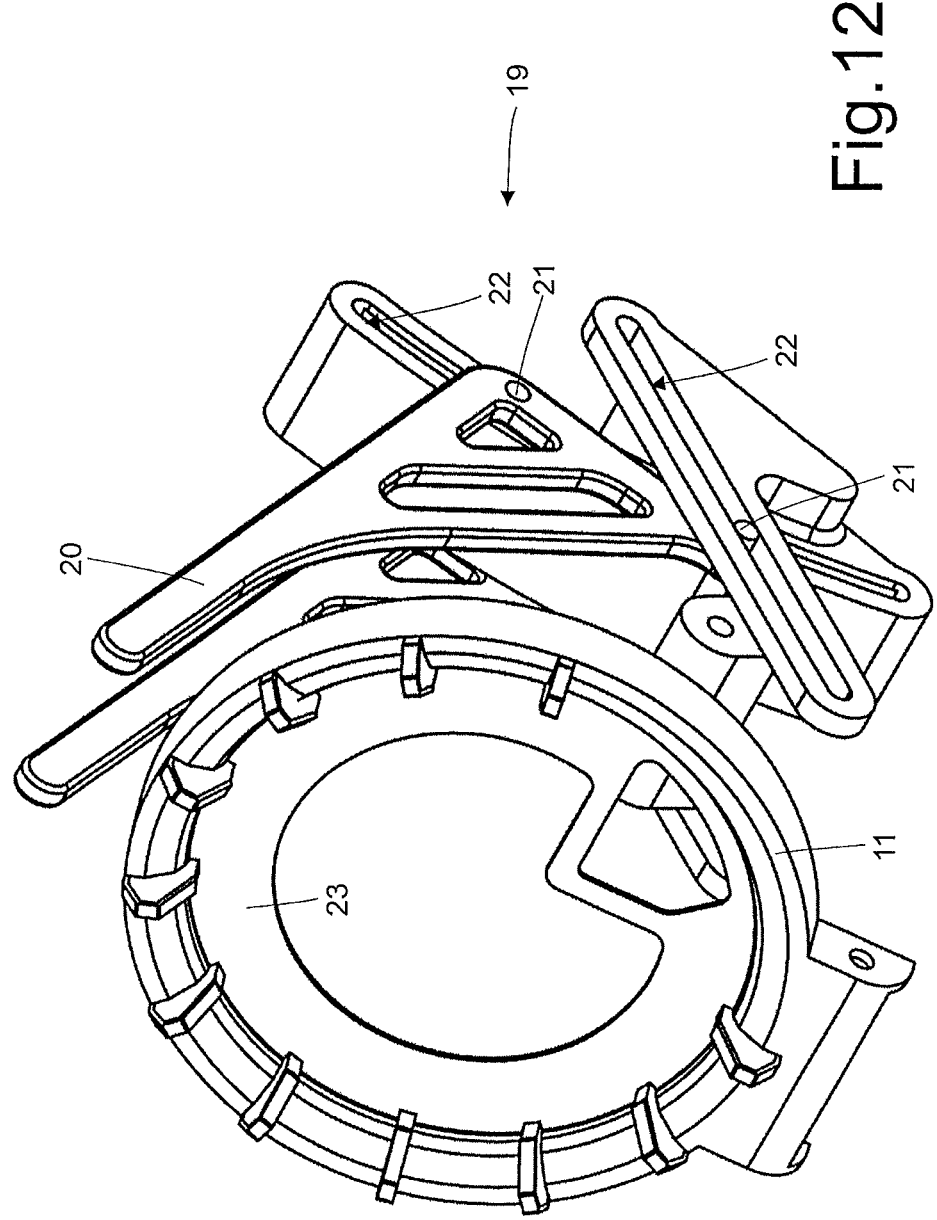
FIG. 12 is a different perspective view of the moving system of FIG. 10.

FIGS. 10, 11 and 12 show a kinematic mechanism 19 that includes a support 20, which has an "L" shape, is rigidly supporting the analogue instrument 10, and has two pairs of pins 21 which engage two corresponding pairs of fixed slides 22 so as to slide along said fixed slides 22.

Figure 13:
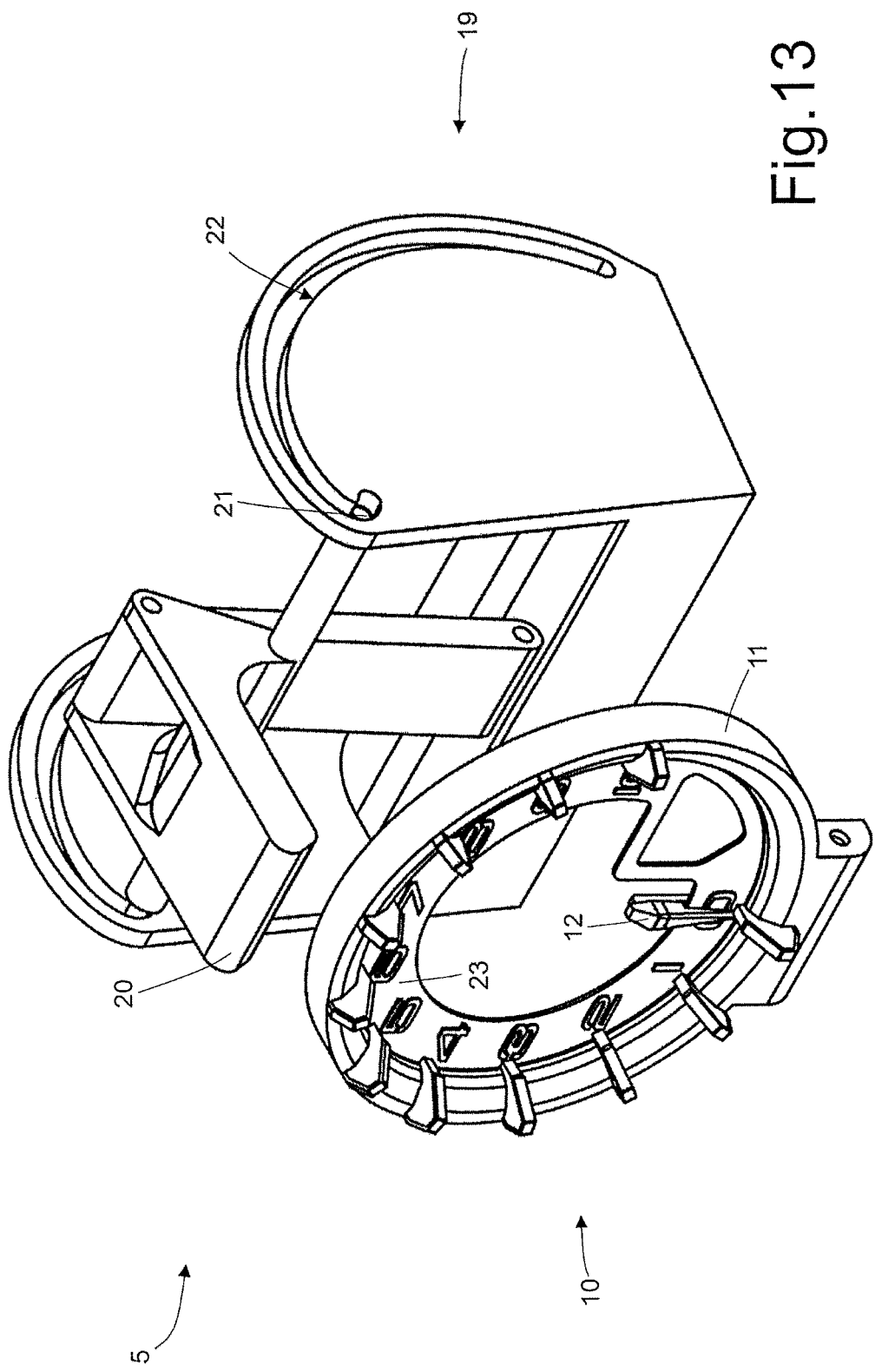
FIG. 13 is a perspective view of a variant of the moving system of FIG. 10.
Figure 14:
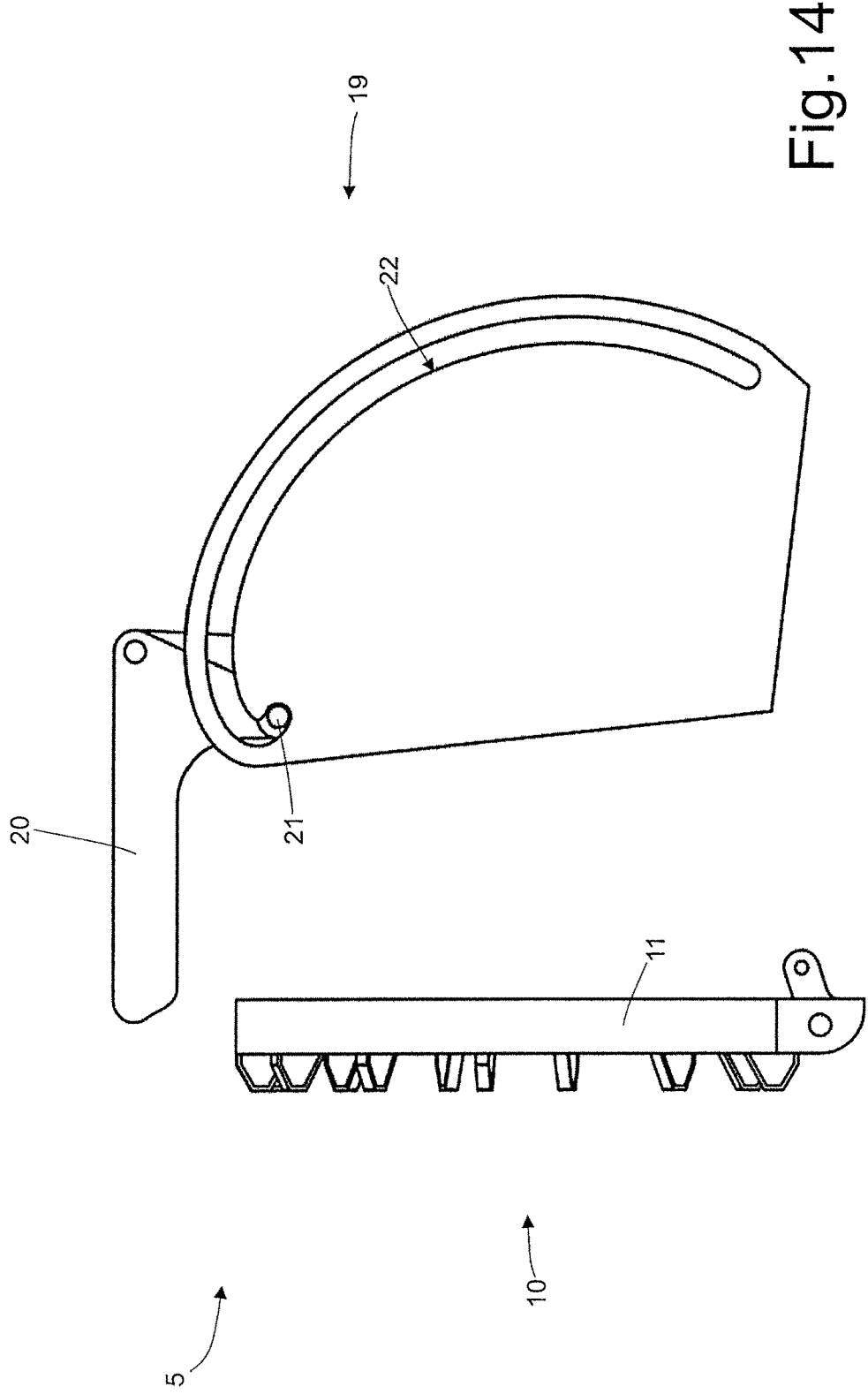
FIG. 14 is a side view of the moving system of FIG. 13.
Figure 15:
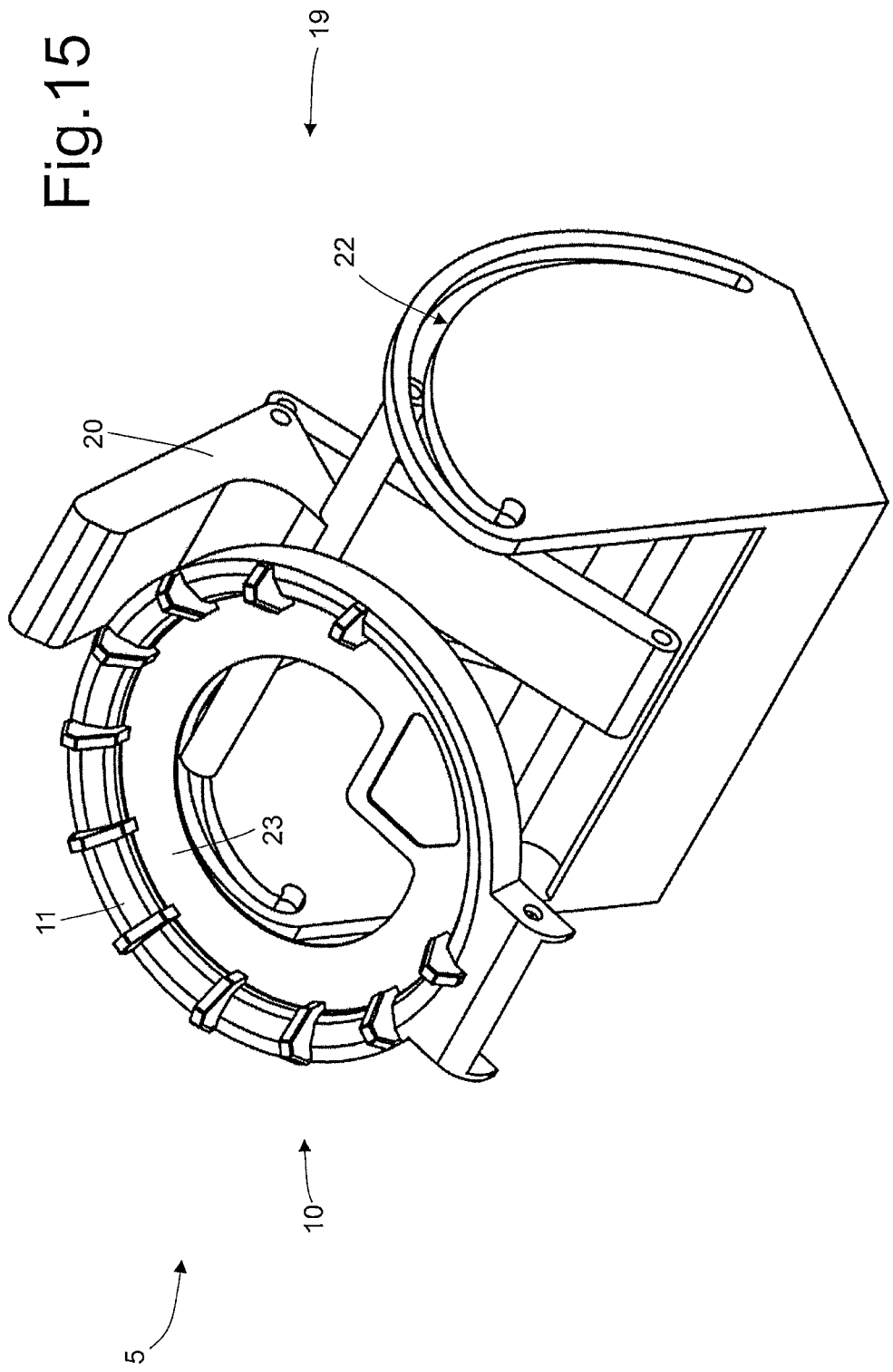
FIG. 15 is a different perspective view of the moving system of FIG. 13.

FIGS. 13, 14 and 15 show a kinematic mechanism 19 that includes a support 20, which has an "L" shape, is rigidly supporting the analogue instrument 10, and has one pair of pins 21 which engage a corresponding pair of fixed slides 22 so as to slide along said fixed slides 22.

Figure 16:
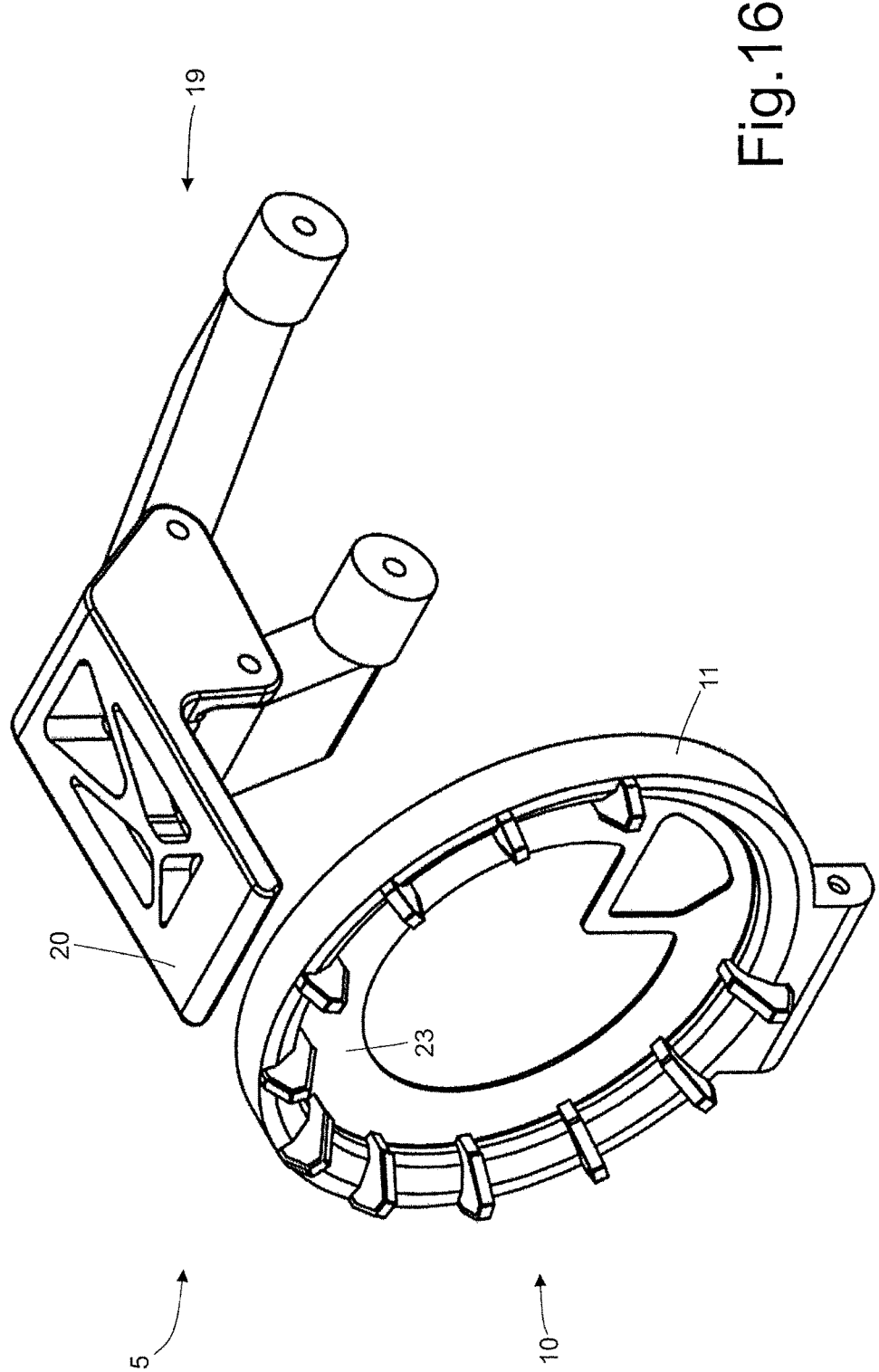
FIG. 16 is a perspective view of a further variant of the moving system of FIG. 10.
Figure 17:
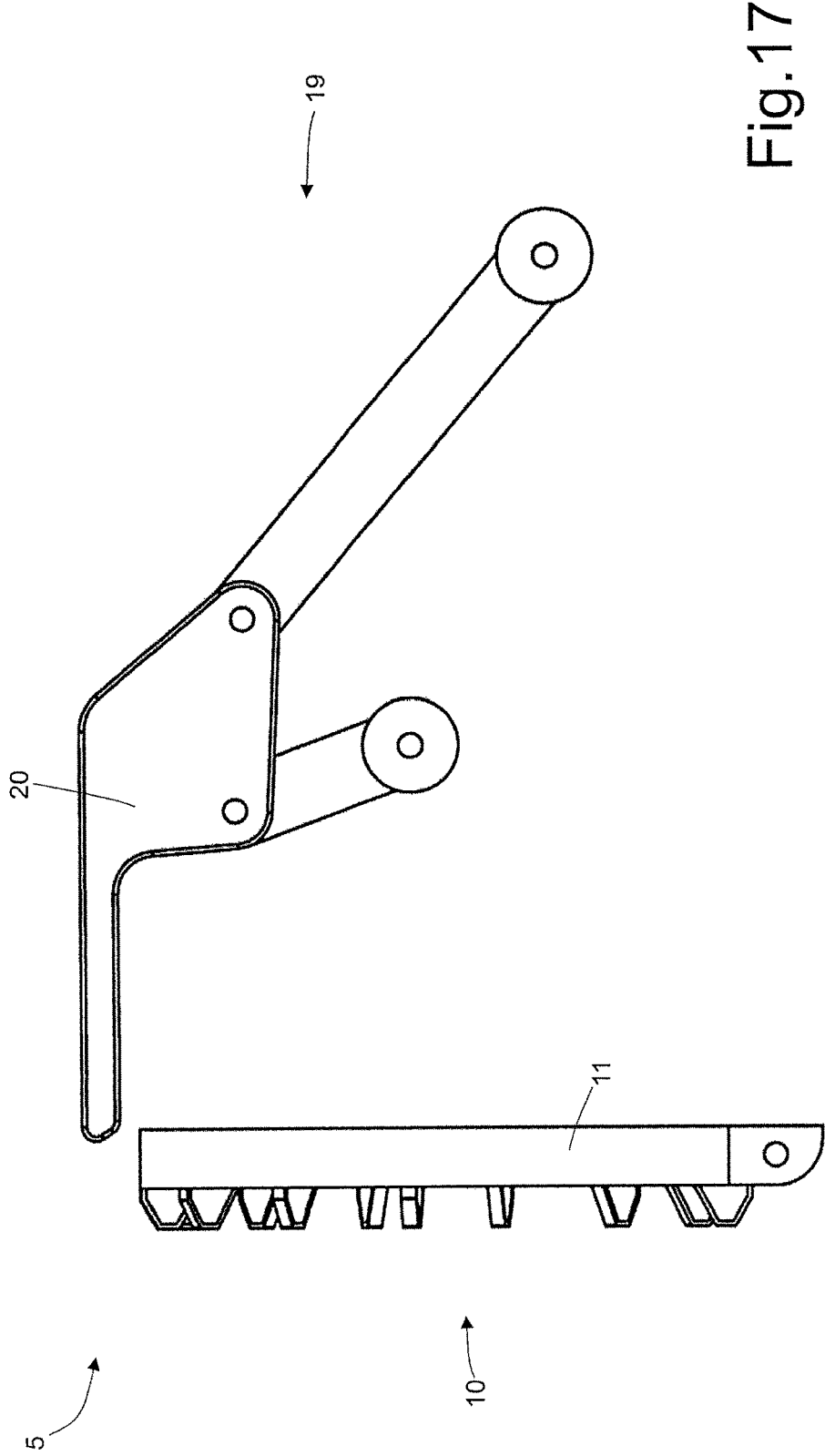
FIG. 17 is a side view of the moving system of FIG. 16.
Figure 18:
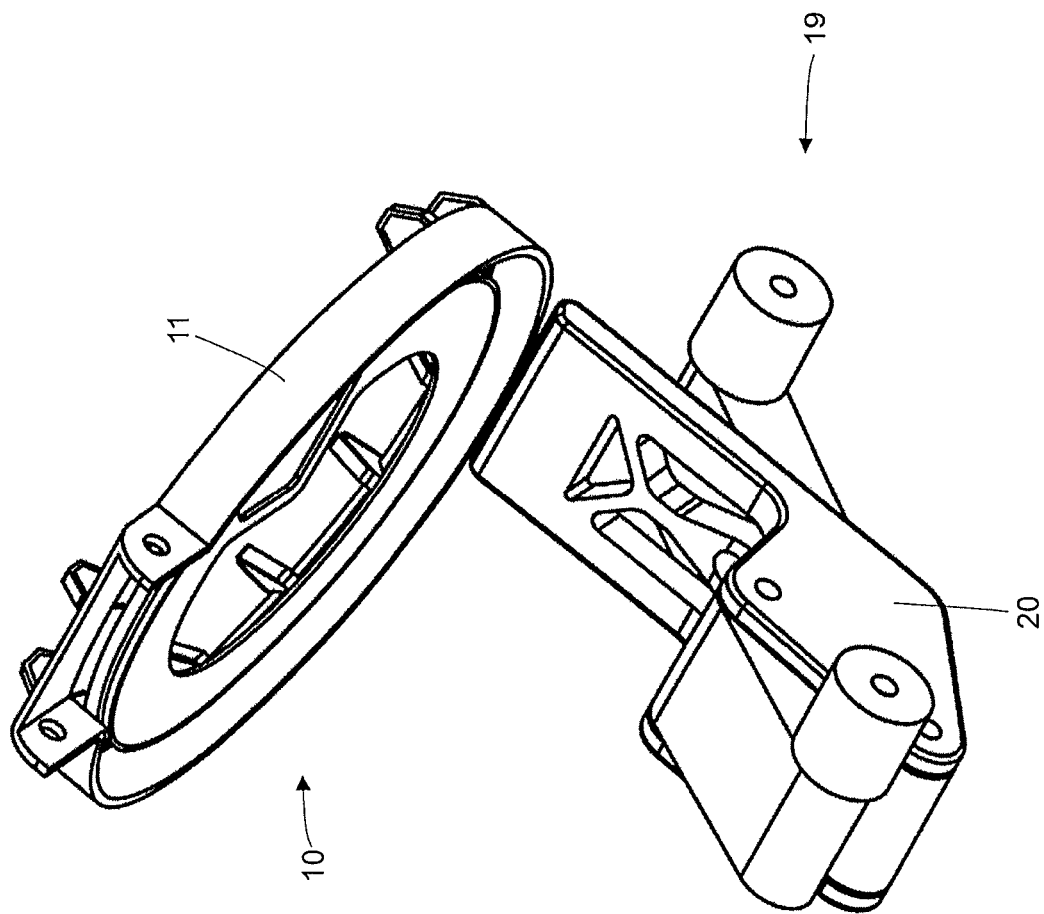
FIG. 18 is a different perspective view of the moving system of FIG. 16.

FIGS. 16, 17 and 18 show a kinematic mechanism 19 that includes a support 20, which has an "L" shape, is rigidly supporting the analogue instrument 10, and is part of an articulated quadrilateral.

In the embodiments illustrated in the accompanying figures, the analogue instrument 10 performs a pure rotation (i.e. entirely devoid of translation) or a rototranslation to move between the rest position and the operating position. According to other embodiments not shown, the analogue instrument 10 performs a pure translation (i.e. entirely devoid of rotation) to move between the rest position and the operating position; in this case, in the rest position the analogue instrument 10 could be located beneath the digital screen 9 or next to the digital screen 9.

According to a preferred embodiment, the dashboard 5 comprises an electric actuator, which performs the movement of the analogue instrument 10 between the rest position and the operating position; if necessary, the dashboard 5 comprises a further electrical actuator which moves the cover 8 relative to the digital screen 9, as shown in FIG. 9.

As shown in FIG. 4, the analogue instrument 10 comprises a circular plate 23, which is located inside the support element 11, is rigidly fixed to the support element 11, and supports a numerical scale of values; in other words, the numerical scale of values is indirectly supported by the support element 11 through the interposition of the plate 23. According to a preferred, but not limiting, embodiment, the plate 23 has at least one through window, through which the underlying digital screen 9 can be seen; in the embodiment illustrated in the attached figures, the plate 23 has two through windows arranged side by side. The through windows of the plate 23 allow for viewing corresponding portions of the underlying digital screen 9 so as to view a portion of the digital screen 9 within the analogue instrument 10. Preferably, the support element 11 and the plate 23 are made of opaque material (i.e. not transparent, i.e. it does not let the light pass through in order to completely obscure the underlying digital screen 9); for instance, the support element 11 and the plate 23 may be made of a metallic material such as aluminium, bronze or brass. Alternatively, the support element 11 may be made of an opaque material, whereas the plate 23 could be made of a material that is at least partially transparent (for example a translucent material).

Figure 19:
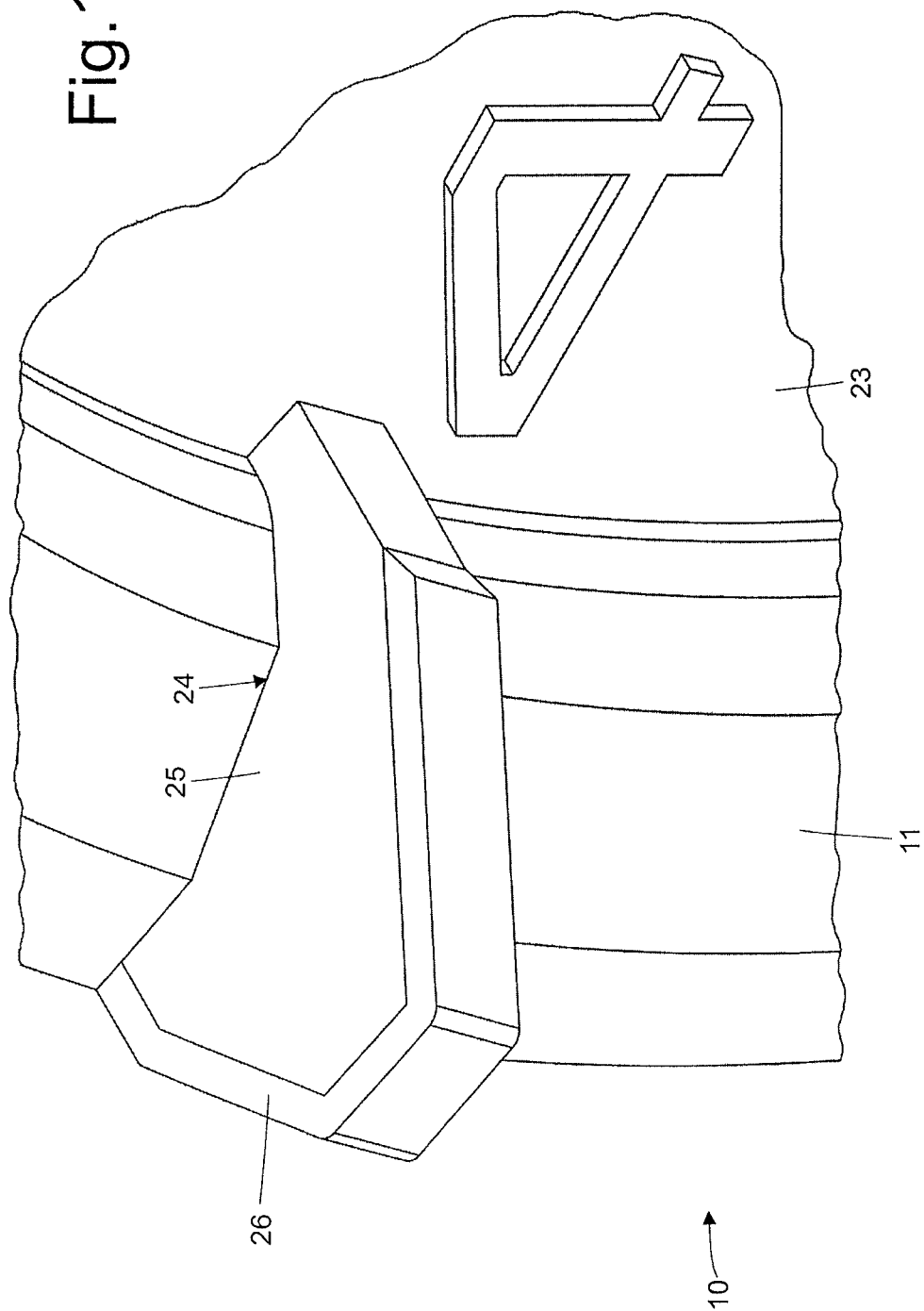
FIG. 19 is a view on an enlarged scale of a detail of the analogue instrument.

As shown more clearly in FIG. 19, the support element of the analogue instrument 10 is opaque and has a plurality of through openings 24, through which the light generated by the underlying digital screen 9 can come out. The analogue instrument 10 comprises a plurality of transparent bodies 25 (for example made of polycarbonate), each of which is arranged in the area of a through opening 24 and is shaped so as to change the path of the light generated by the underlying digital screen 9. In particular, each transparent body 25 is shaped so as to give the light generated by the underlying digital screen 9 a direction (mainly) parallel to said digital screen 9, so as to light up the analogue instrument 10 with a grazing light (which allows for an optimal view of the analogue instrument 10 itself). In other words, the light emitted by the digital screen 9 in the area of the through openings 24 of the support element 11 is "captured" and deflected by the corresponding transparent bodies 25 so as to come out of the support element 11 through the through openings 24 with a direction (mainly) parallel to the digital screen 9 itself and thus light up the analogue instrument 10 with a grazing light. In this way, the lighting of the analogue instrument 10 does not require the presence of additional lighting elements, but uses only the light emitted by the underlying digital screen 9.

According to a preferred (but not limiting) embodiment, the support element 11 has a satin surface finish (for example by means of a micro-knurling) which enhances the grazing light given by the transparent bodies 25.

Figure 20:
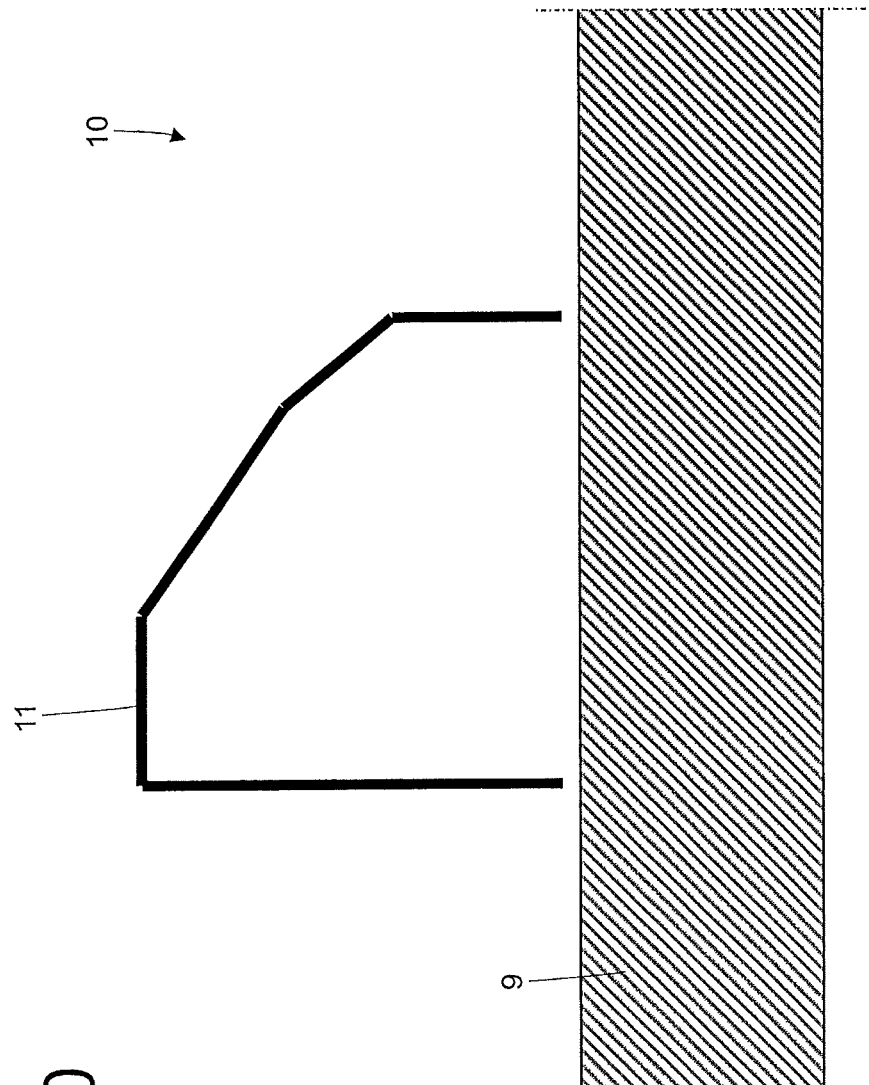
FIGS. 20 and 21 are two different cross sections of a support element of the analogue instrument.
Figure 21:
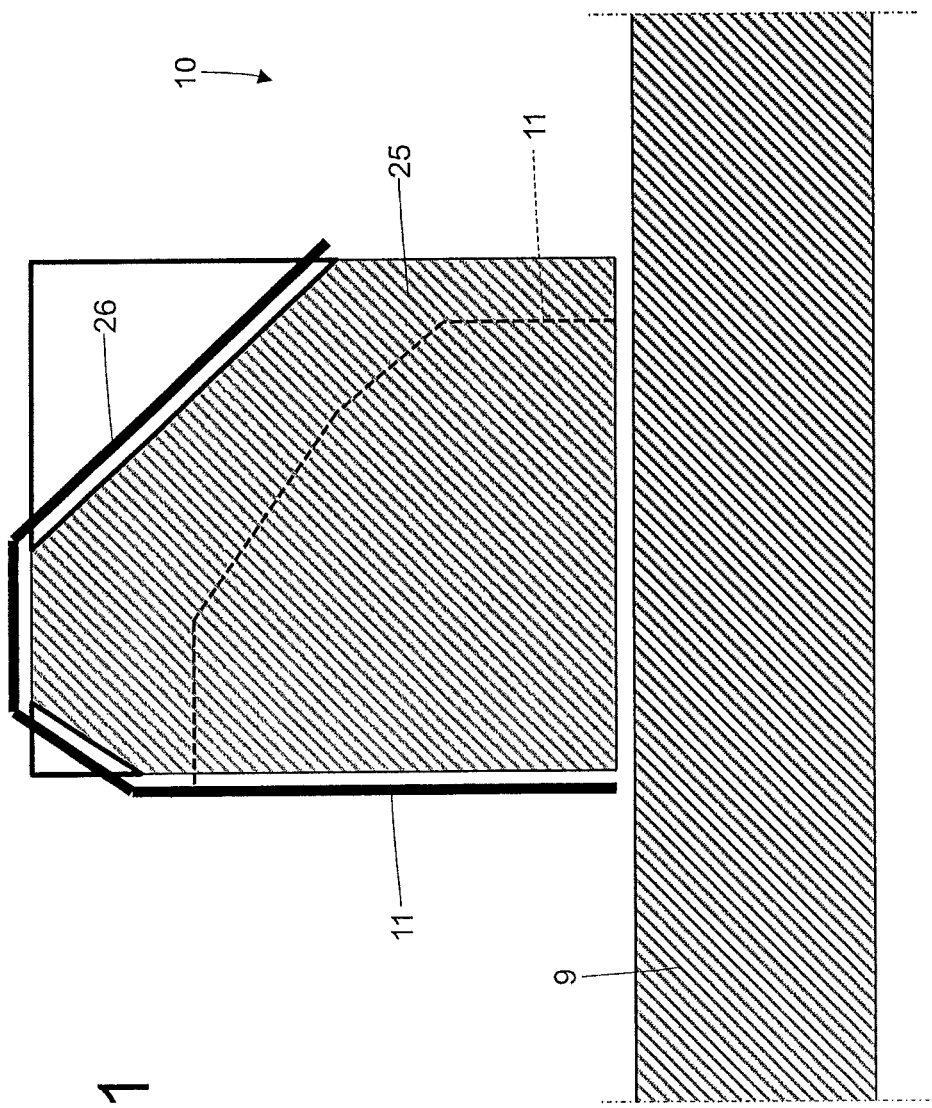
Figure 22:
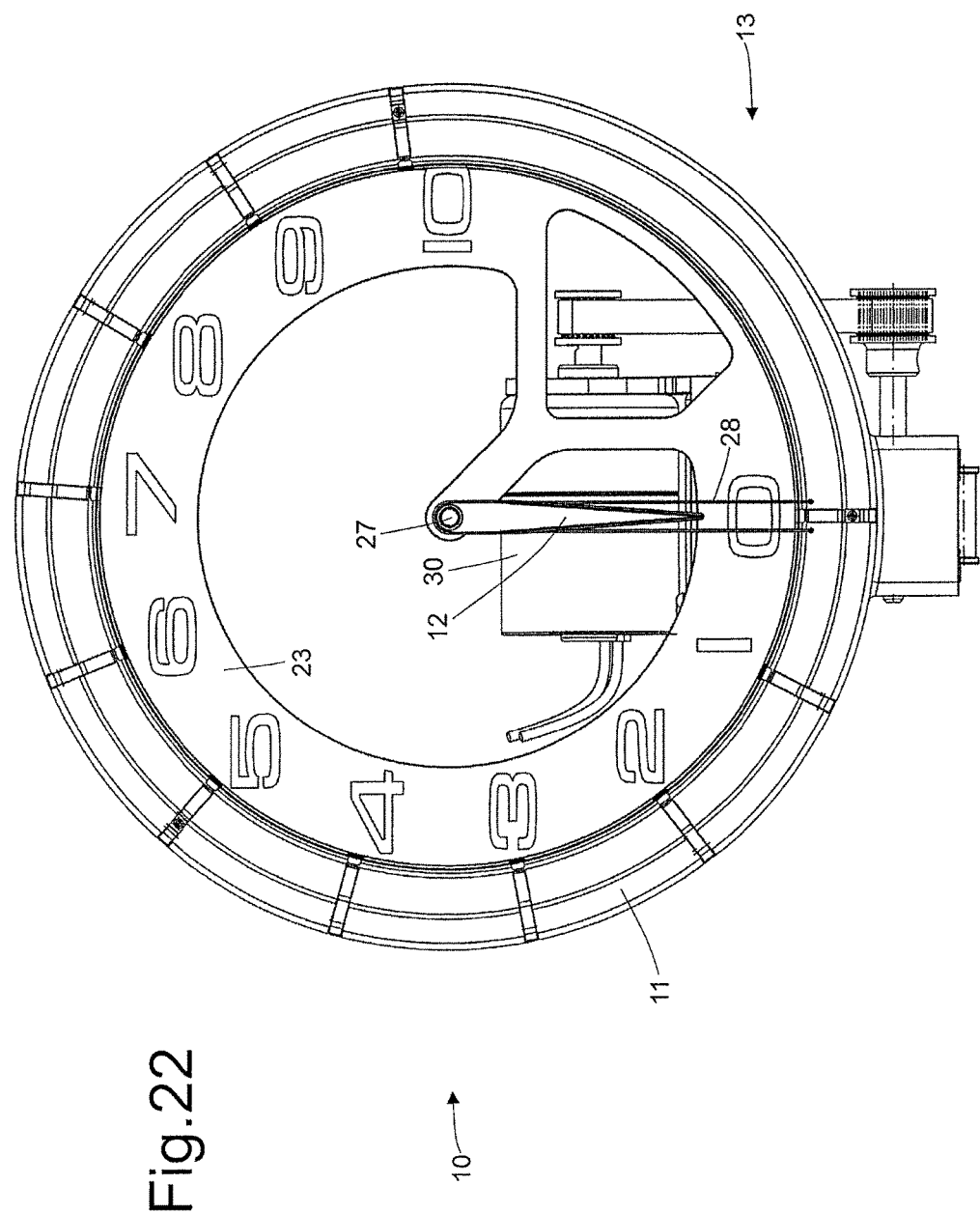
FIG. 22 is a front view of a variant of the analogue instrument of FIG. 3.
Figure 23:
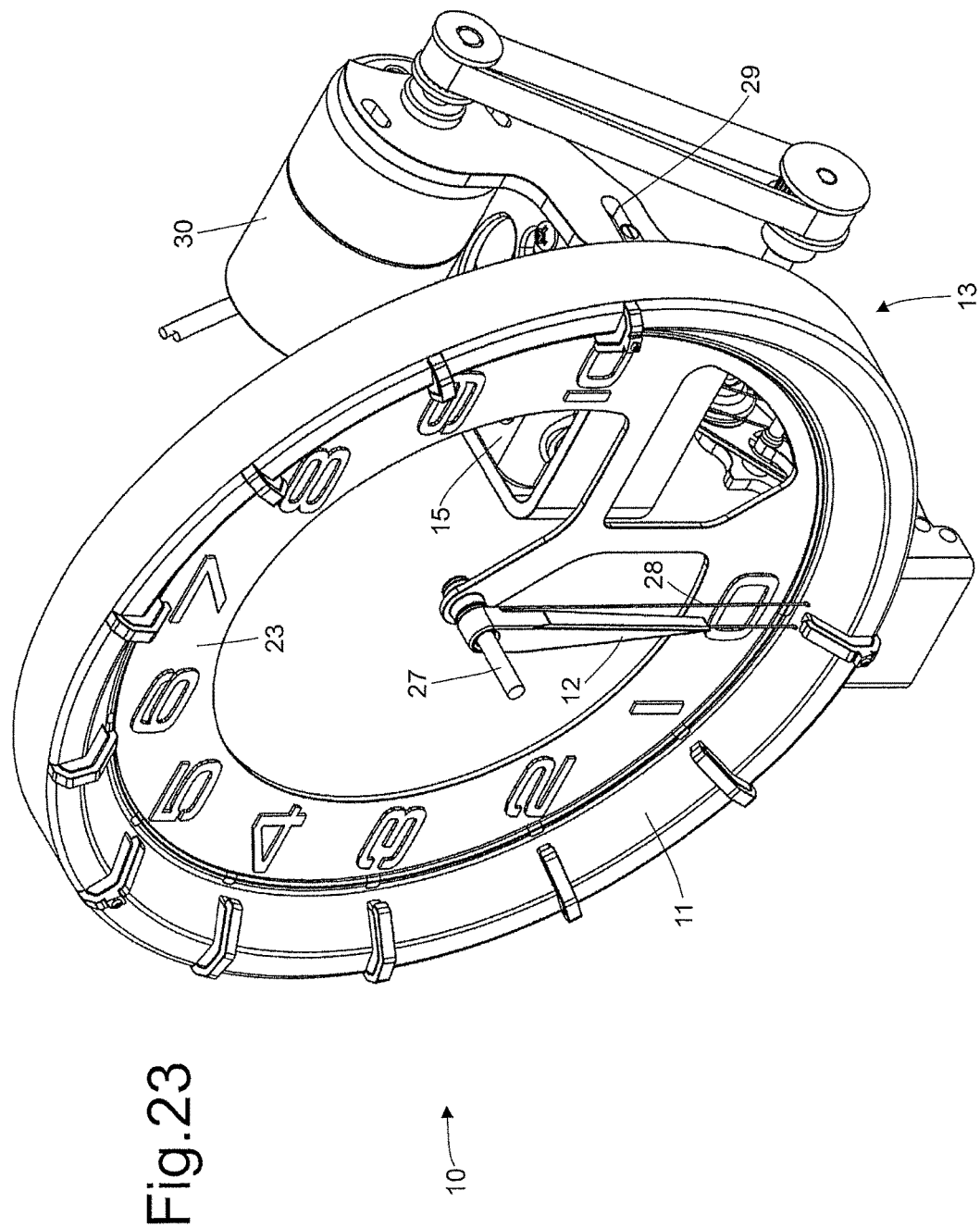
FIG. 23 is a perspective front view of the analogue instrument of FIG. 22.
Figure 24:
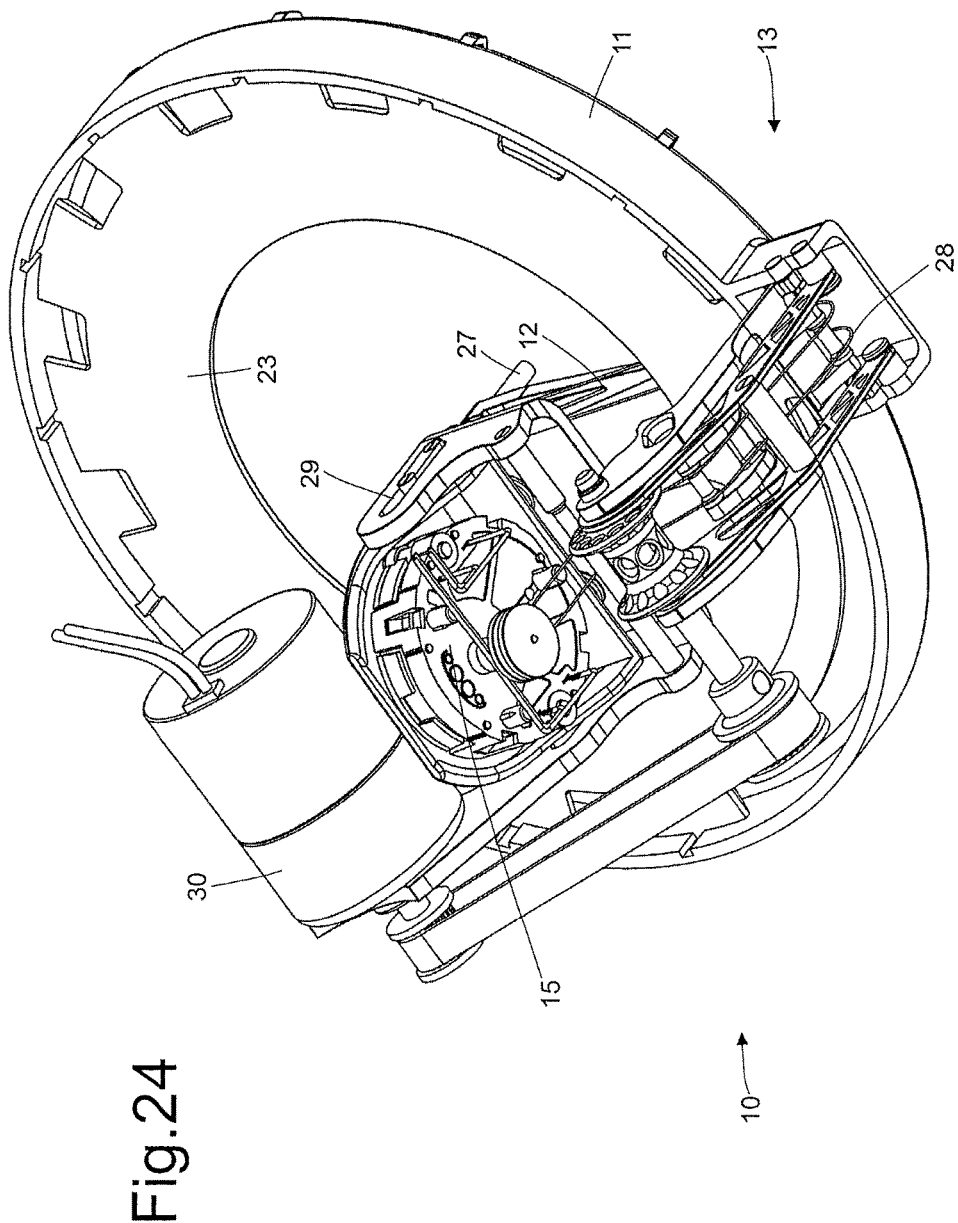
FIG. 24 is a perspective rear view of the analogue instrument of FIG. 22.
Figure 25:
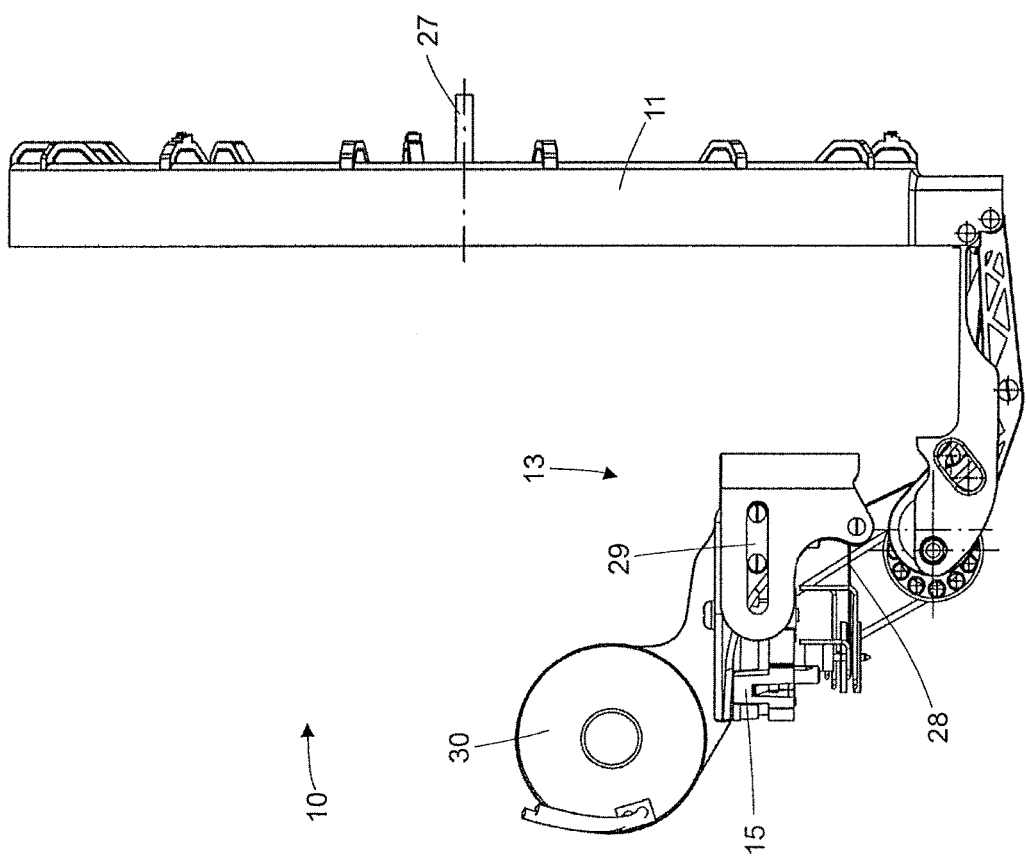
FIG. 25 is a side view of the analogue instrument of FIG. 22.

According to a preferred (but not limiting) embodiment illustrated in FIGS. 19, 20 and 21, the support element 11 of the analogue instrument 10 is lifted, is hollow on the inside and is "U"-shaped in its cross-sectional view. Each through opening 24 is formed by cutting the support element 11 with two cuts parallel to one another and by lifting the part of the support element 11 arranged between the two cuts from the remaining part of the support element 11; in this way, a protrusion 26 is formed at each through opening 24, which lifts up in a cantilever fashion from the support element 11, is a seamless, integral part of the support element 11 and constitutes a (partial) cover of the corresponding transparent body 25, by resting against an upper wall of said transparent body 25. In other words, at each through opening 24, the lifted part (i.e. the protrusion 26) of the support element 11 rests against an upper wall of the respective transparent body 25.

In the illustrated embodiments, the analogue instrument 10 is a rev counter that indicates the number of revolutions of the internal combustion engine; alternatively, the analogue instrument 10 could be used for other types of measurement (for example it could be a speedometer).

In the illustrated embodiments, the analogue instrument 10 can be moved between the operating position and the rest position. According to a further, non-illustrated embodiment, the analogue instrument 10 is fixed relative to the digital screen 9, so as to be permanently arranged in the operating position.

FIGS. 22-25 show a variant of the analogue instrument 10, wherein the pointer 12 is hinged to the centre of said analogue instrument 10. In particular, a central pin 27 is provided, which is supported at one end by the plate 23 and at the opposite end by a round and transparent screen (not shown in the attached figures), which is arranged above the analogue instrument 10, protecting it; the central pin 27 supports the pointer 12 in a cantilever fashion (i.e. the pointer 12 is rigidly fixed to the central pin 27) and is hinged so as to rotate around its central axis under the thrust of the electric motor 15. The central pin 27 may be coupled to a spring that pushes said central pin 27 towards a rest position (i.e. a position corresponding to the measure "zero" illustrated in the attached figures). The electric motor 15 is located behind the analogue instrument 10 (and also behind the digital screen 9) and is mechanically connected to the central pin 27 by means of a flexible transmission element 28 (preferably consisting of a thin, circular cross-section wire), which is closed as a ring.

According to a preferred embodiment, the electric motor 15 is housed in a frame of the analogue instrument 10 so as to be able to slide relative to the frame itself under the thrust of a tensioning spring; in particular, two pins of the electric motor 15 engage corresponding slots 29 of the frame of the analogue instrument 10 so as to be able to slide within said slots 29 under the thrust of the tensioning spring. In this way, the electric motor 15 keeps the flexible transmission element 28 in continuous tension (with a tension proportional to the elastic thrust generated by the tensioning spring), compensating for the relative movements between the electric motor 15 and the central pin 27 due to the movement of the analogue instrument 10 between the operating position (shown in FIGS. 22-25) and the rest position.

FIGS. 22-25 also show the electric motor 30, which controls the rotation of the analogue instrument 10 around the fixed rotation axis 16 when it moves between the operating position and the rest position.

The dashboard 5 described above has many advantages.

First of all, the dashboard 5 described above allows for viewing only the digital screen 9 when the driver requires the display of complex information (typically a chart navigator during "cruising" speed) and also allows for overlapping the analogue instrument 10 over the digital screen 9 when the driver requires this type of instrumentation for a "sporty" driving style. In other words, the dashboard 5 described above does not reflect a watered-down compromise between the need of having a large digital screen 9 and the conflicting need of also having a large analogue instrument 10; in fact, the dashboard 5 described above makes it possible to have both a large digital screen 9 and a large analogue instrument 10, allowing for the view of one or the other depending on the driver's wishes.

Furthermore, the dashboard 5 described above has a relatively small size and, therefore, can be integrated in any type of vehicle.

Lastly, the dashboard 5 described above has a relatively low manufacturing cost as it uses simple components that are easily available on the market.

Of course, the dashboard 5 described above advantageously applies to any type of road vehicle (for instance, a car or a motorcycle).

The invention claimed is:

1. A dashboard for a road vehicle; the dashboard comprising:
   a digital screen; and
   an analogue instrument, which comprises a support element with a circular shape and a pointer moving on the inside of the support element;
   wherein the analogue instrument can be arranged in an operating position, in which the analogue instrument overlaps the digital screen so that the support element of the analogue instrument covers a corresponding part of said digital screen;
   wherein the support element of the analogue instrument is opaque and has a plurality of through openings, through which light generated by the underlying digital screen can come out.

2. The dashboard according to claim 1, wherein the analogue instrument has, in the middle, at least one through window to show an underlying part of the digital screen.

3. The dashboard according to claim 1, wherein the support element of the analogue instrument comprises a numerical scale of values.

4. The dashboard according to claim 1, wherein the analogue instrument comprises a plurality of transparent bodies, each of which is arranged in an area of a through opening and is shaped so as to change a path of the light generated by the underlying digital screen.

5. The dashboard according to claim 4, wherein each transparent body is shaped so as to give the light generated by the underlying digital screen a direction that is parallel to said digital screen, so as to light up the analogue instrument with a grazing light.

6. The dashboard according to claim 1, wherein the support element of the analogue instrument has an annular shape, is hollow on the inside, and is "U"-shaped in a cross-sectional view.

7. The dashboard according to claim 6, wherein each through opening is made by cutting the support element with two parallel cuts and by lifting the part of the support element arranged between the two cuts from the remaining part of the support element.

8. The dashboard according to claim 7, wherein:
   the analogue instrument comprises a plurality of transparent bodies, each of which is arranged in an area of a through opening and is shaped so as to change a path of the light generated by the underlying digital screen; and
   in the area of each through opening, the lifted part of the support element rests against an upper wall of the respective transparent body.

9. The dashboard according to claim 1, wherein the analogue instrument is fixed relative to the digital screen, so as to be permanently arranged in the operating position.

10. The dashboard according to claim 1, wherein the analogue instrument is movable relative to the digital screen, so as to be moved between the operating position, in which the analogue instrument overlaps the digital screen, and a rest position, in which the analogue instrument does not overlap the digital screen.

11. The dashboard according to claim 10, wherein the analogue instrument is connected to a frame of the dashboard by means of a kinematic mechanism, which causes the analogue instrument to perform a rototranslation during movement between the operating position and the rest position.

12. The dashboard according to claim 11, wherein, in the rest position, the analogue instrument is behind the digital screen.

13. The dashboard according to claim 12, wherein, above the digital screen there is provided a cover, which is mounted so as to be movable and liftable, thus becoming detached from said digital screen, when the analogue instrument moves between the rest position and the operating position.

14. The dashboard according to claim 1, wherein the analogue instrument comprises:
   a central pin, which supports the pointer in a cantilever fashion and is hinged so as to rotate around a central axis;
   an electric motor, which controls rotation of the central pin; and
   a flexible transmission element, which is closed as a ring and transmits motion from the electric motor to the central pin.

15. The dashboard according to claim 14, wherein the electric motor is housed in a frame of the analogue instrument, so as to be able to slide relative to the frame under thrust of a tensioning spring.

* * * * *